US010560562B1

(12) United States Patent
Tandon

(10) Patent No.: US 10,560,562 B1
(45) Date of Patent: Feb. 11, 2020

(54) MULTI-MODE SMARTPHONE OR MOBILE COMPUTING DEVICE

(71) Applicant: Darpan Tandon, Bellflower, CA (US)

(72) Inventor: Darpan Tandon, Bellflower, CA (US)

( * ) Notice: Subject to any disclaimer, the term of this patent is extended or adjusted under 35 U.S.C. 154(b) by 59 days.

(21) Appl. No.: 16/001,931

(22) Filed: Jun. 6, 2018

Related U.S. Application Data

(63) Continuation-in-part of application No. 29/647,038, filed on May 9, 2018.

(51) Int. Cl.
| | | |
|---|---|---|
| *H04M 1/725* | (2006.01) | |
| *H01Q 21/28* | (2006.01) | |
| *H04W 88/06* | (2009.01) | |
| *H01Q 1/24* | (2006.01) | |

(52) U.S. Cl.
CPC ........ *H04M 1/72522* (2013.01); *H01Q 21/28* (2013.01); *H04W 88/06* (2013.01); *H01Q 1/243* (2013.01); *H04M 1/72583* (2013.01); *H04M 2201/42* (2013.01)

(58) Field of Classification Search
CPC ... H04M 1/72522; H01Q 21/28; H01Q 1/243; H04W 88/06; H04W 4/80; G06F 1/1626; G06F 1/1632; H04B 1/50; H04B 1/52; H04B 5/0037; H04B 5/0012; H04B 5/0075; H04B 1/40
See application file for complete search history.

(56) References Cited

U.S. PATENT DOCUMENTS

| | | | | |
|---|---|---|---|---|
| 5,535,430 A | * | 7/1996 | Aoki ........................ | H04B 1/40 455/12.1 |
| 6,134,437 A | | 10/2000 | Karabinis | |
| 6,501,939 B1 | | 12/2002 | Dent | |
| 7,218,931 B2 | | 5/2007 | Karabinis | |
| D558,756 S | | 1/2008 | Andre | |
| 7,596,111 B2 | | 9/2009 | Karabinis | |

(Continued)

OTHER PUBLICATIONS

ZTE Eco-Mobius, YouTube, Jan. 2014 https://www.youtube.com/watch?v=opIK7LCP0NQ (Year: 2014).*

(Continued)

*Primary Examiner* — Jianxun Yang
(74) *Attorney, Agent, or Firm* — Eric Kelly

(57) ABSTRACT

Smartphones with multi-mode functionality allowing the given smartphone to connect to and utilize technologically diverse and different networks (e.g., terrestrial based cellular and/or Wi-Fi networks and/or satellite based networks), as well as different networks being operated by different service providers are described. Such smartphones may have at least three different antenna and radio communications integrated circuits, one for cellular and/or Wi-Fi communications, one for satellite communications, and one for communications across the internet. For example, if a cellular and/or Wi-Fi network may not be available, then the smartphone may connect to a satellite network. The dedicated antenna for satellite communications may be extendable and retractable. Such smartphones may have a LED lighting system (Lumminax System) for indicating incoming communications. Such smartphones may also be charged by solar energy due to integrated solar panel(s). Such smartphones may also have integrated proprietary "apps" for managing various devices connected to the internet.

22 Claims, 24 Drawing Sheets

(56) References Cited

U.S. PATENT DOCUMENTS

| | | |
|---|---|---|
| 7,603,081 B2 | 10/2009 | Karabinis |
| 7,606,590 B2 | 10/2009 | Karabinis |
| 7,623,859 B2 | 11/2009 | Karabinis |
| 8,811,363 B2 | 8/2014 | Velasco |
| 8,958,823 B2 | 2/2015 | Ortiz |
| 9,041,338 B2 | 5/2015 | Shen |
| 9,049,745 B2 | 6/2015 | Mujtaba |
| 9,084,179 B2 | 7/2015 | Visuri |
| 9,288,831 B2 | 3/2016 | Visuri |
| D761,749 S | 7/2016 | Lee |
| D762,209 S | 7/2016 | Akana |
| D767,562 S | 9/2016 | Jang |
| D787,466 S | 5/2017 | Nishikawa |
| 9,642,055 B2 | 5/2017 | Vallabhu |
| D789,316 S | 6/2017 | Chou |
| D790,535 S | 6/2017 | Akana |
| D791,098 S | 7/2017 | Park |
| D800,716 S | 10/2017 | Akana |
| D803,209 S | 11/2017 | Akana |
| D806,705 S | 1/2018 | Akana |
| 9,906,989 B2 | 2/2018 | Buckle |
| D812,050 S | 3/2018 | Mitchell |
| 2003/0054762 A1 | 3/2003 | Karabinis |
| 2004/0023658 A1 | 2/2004 | Karabinis |
| 2004/0121727 A1 | 6/2004 | Karabinis |
| 2004/0192200 A1 | 9/2004 | Karabinis |
| 2004/0259585 A1 | 12/2004 | Yitzchak |
| 2005/0227618 A1 | 10/2005 | Karabinis |
| 2005/0239403 A1 | 10/2005 | Karabinis |
| 2006/0040657 A1 | 2/2006 | Karabinis |
| 2006/0111041 A1 | 5/2006 | Karabinis |
| 2007/0291188 A1* | 12/2007 | Wernersson ............... G09F 9/33 348/790 |
| 2011/0141358 A1* | 6/2011 | Hardacker ......... H04N 5/44513 348/563 |
| 2013/0080670 A1* | 3/2013 | Medica ................. G06F 1/1626 710/110 |
| 2015/0011220 A1 | 1/2015 | Buckle |
| 2015/0147971 A1 | 5/2015 | Park |
| 2015/0288422 A1* | 10/2015 | Fishman .............. H04B 5/0037 455/41.1 |
| 2016/0234281 A1* | 8/2016 | Padmanabhan ....... H04W 4/029 |

OTHER PUBLICATIONS

Product Title: Thuraya SatSleeve; Possible Disclosure Date: at least as early as Feb. 28, 2018; Website: http://www.thuraya.com/SatSleeve see included NPL file included in this filing with screenshot from this website.

Product Title: SPOT Connect; Possible Disclosure Date: Aug. 10, 2012; Website: http://www.ohgizmo.com/2012/08/10/spot-connect-giyes-your-smartphone-satellite-access/ see included NPL file included in this filing with screenshot from this website.

* cited by examiner

MULTI-MODE SMARTPHONE OR MOBILE COMPUTING DEVICE

PRIORITY NOTICE

The present application, a continuation-in-part application, claims priority under 35 U.S.C. § 120 to U.S. Nonprovisional patent application Ser. No. 29/647,038 filed on May 9, 2018, the disclosure of which is incorporated herein by reference in its entirety.

TECHNICAL FIELD OF THE INVENTION

The present invention relates in general to smartphones, cellular phones, satellite phones, and mobile computing devices (such as, but not limited to, tablet computing devices) and more specifically to such devices (e.g., smartphones) that are capable of connecting to different types of networks, including, but not limited to, networks from different service providers, cellular networks, WiFi networks, LP networks (e.g., LoraWAN or Symphony Link), satellite networks, LP cellular networks (e.g., LTE-M or NB-IOT), and the like.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Circa year 2018, we have witnessed progress in wireless technology over the years. It is not a matter of distant memory that when cellular phone calls were made, one hoped not have that call dropped (failed) before finishing a conversation or one hoped that the call would have clarity throughout the call. Since 2001 (from 2G days to now 4G), we have seen improvements in voice quality, secure connections, data bandwidth, and data speed; but fundamental problems still remain. Such problems include network coverage limitations, as well as, problems using a given cell phone in multiple regions, countries, and/or globally. Often such problems are due, at least in part, that the given cell phone may have hardware and/or software features limiting its use to particular type of network, or limiting its use to a network operated by a specific service provider. The cell phones of today, including smartphones, do not work well for data transmission, including calls, in bad coverage areas, during traffic congestion, moving from network to another operated by different service providers, or across diverse geographic regions, such as across different countries or globally.

There is a need in the art for a smartphone that can connect to technologically diverse and different networks (e.g., terrestrial based cellular and/or Wi-Fi networks and/or satellite based networks), as well as different networks being operated by different service providers.

It is to these ends that the present invention has been developed.

BRIEF SUMMARY OF THE INVENTION

To minimize the limitations in the prior art, and to minimize other limitations that will be apparent upon reading and understanding the present specification, the present invention describes smartphones with multi-mode functionality allowing the given smartphone to connect to and utilize technologically diverse and different networks (e.g., terrestrial based cellular and/or Wi-Fi networks and/or satellite based networks), as well as different networks being operated by different service providers. For example, and without limiting the scope of the present invention, such smartphones may connect to and utilize, cellular/Wi-Fi networks, LP cellular networks (e.g., LTE-M, NB-IOT, and/or the like), satellite networks (e.g., satellite-mobile networks, satellite Wi-Fi networks, and/or the like), LP networks (e.g., LoraWAN, Symphony Link, and/or the like) (i.e., low power wide area networks), and other networks. In some embodiments, such smartphones may comprise at least three different antenna and radio communications integrated circuits, one for cellular and/or Wi-Fi communications, one for satellite communications, and one for communications across the internet. For example, and without limiting the scope of the present invention, if a cellular and/or Wi-Fi network may not be available, then the smartphone may connect to a satellite network. In some embodiments, the dedicated antenna for satellite communications may be extendable and retractable. In some embodiments, such smartphones may comprise at least two different types of processors, baseband processor(s) and application processor(s); wherein the baseband processor(s) may control at least two of the three different antenna and radio communications integrated circuits; wherein the applications processor(s) may control the third of the three different antenna and radio communications integrated circuits, a wireless-radio for communications that may utilize the internet. In some embodiments, such smartphones may have a lighting system (known as Lumminax) with LEDs around a periphery of the smartphone for indicating incoming communications. In some embodiments, such smartphones may also be charged by solar energy due to integrated solar panel(s). In some embodiments, such smartphones may also have integrated proprietary "apps" (i.e., applications or computer programs) for managing various devices connected to the internet.

It is an objective of the present invention to provide a smartphone with multi-mode functionality allowing the given smartphone to connect to and utilize technologically diverse and different networks (e.g., terrestrial based cellular and/or Wi-Fi networks and/or satellite based networks), as well as different networks being operated by different service providers.

It is another objective of the present invention to provide a smartphone that may connect to and/or utilize: cellular/Wi-Fi networks, LP cellular networks (e.g., LTE-M, NB-IOT, and/or the like), satellite networks (e.g., satellite-mobile networks, satellite Wi-Fi networks, and/or the like), LP networks (e.g., LoraWAN, Symphony Link, and/or the like) (i.e., low power wide area networks), and/or other networks.

It is another objective of the present invention to provide a smartphone with at least three different antenna and radio communications integrated circuits, one for cellular and/or Wi-Fi communications, one for satellite communications, and one for communications across the internet.

It is another objective of the present invention to provide a smartphone with a dedicated antenna for satellite communications may be extendable and retractable.

It is another objective of the present invention to provide a smartphone with at least two different types of processors, baseband processor(s) and application processor(s); wherein the baseband processor(s) may control at least two of three different antenna and radio communications integrated circuits; wherein the applications processor(s) may control the third of the three different antenna and radio communications integrated circuits, a wireless-radio for communications that may utilize the internet.

It is another objective of the present invention to provide a smartphone that may have a lighting system (known as Lumminax) with LEDs around a periphery of the smartphone for indicating incoming communication notifications.

It is another objective of the present invention wherein the lighting system may react differently for different types of incoming communications.

It is another objective of the present invention wherein the lighting system may react differently depending upon an identity of a sender of the incoming communication.

It is another objective of the present invention wherein the lighting system may be customizable.

It is another objective of the present invention to provide a smartphone that may be charged (or partially charged) by solar energy due to integrated solar panel(s).

It is yet another objective of the present invention to provide a smartphone that may have integrated proprietary "apps" (i.e., applications or computer programs) for managing various devices connected to the internet.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 16. may depict a block diagram showing various communication pathways and various different network types that the smartphones of FIG. 1 through FIG. 14 may wirelessly connect to.

Figure 1:
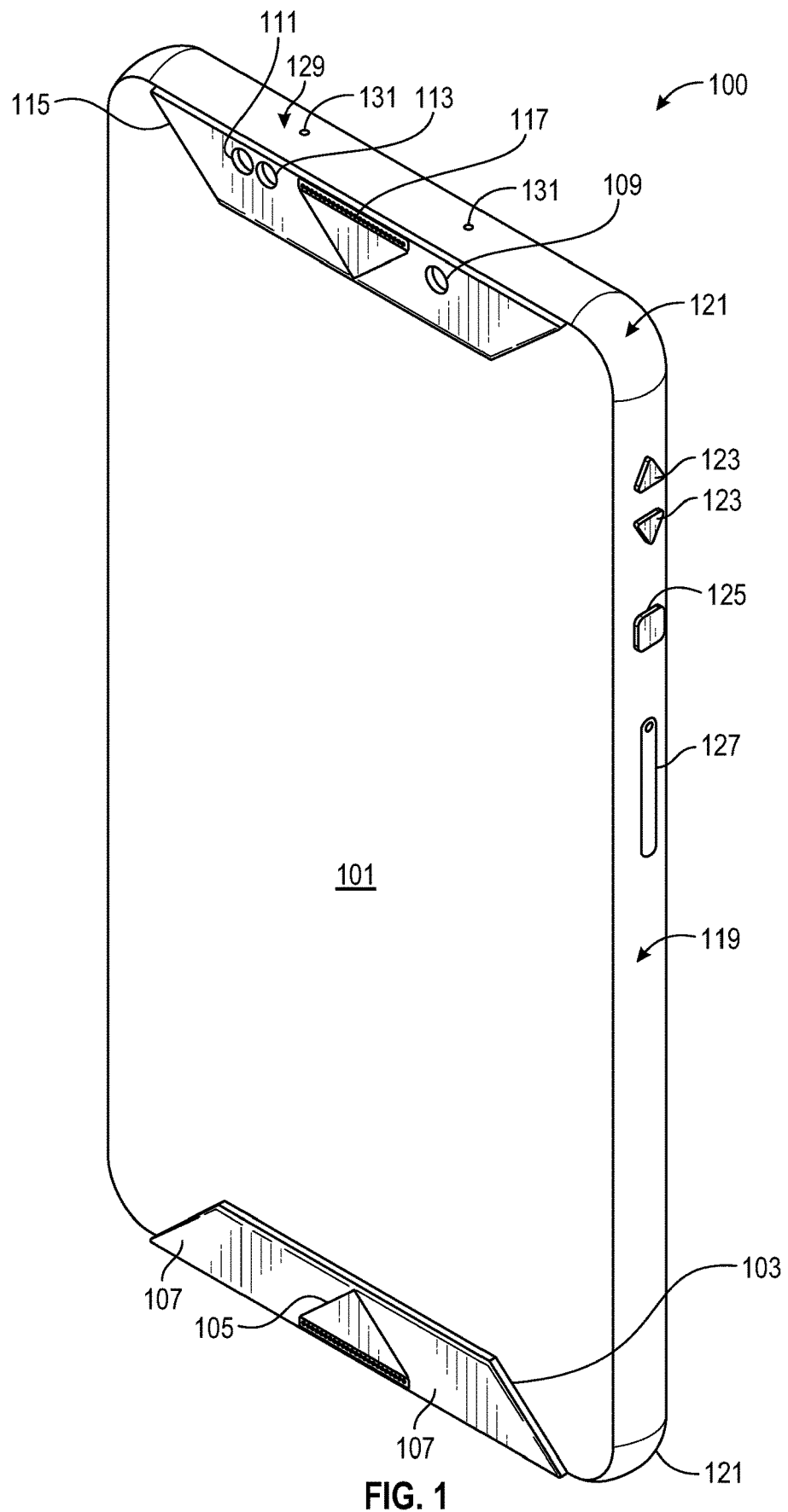
FIG. 1 may depict a front perspective view of a smartphone according to one embodiment.

REFERENCE NUMERALS IN THE DRAWING FIGS 100 smartphone 100
101 touchscreen 101
103 bottom-panel 103
105 home-screen-button 105
107 virtual-button 107
109 front-camera 109
111 light-sensor 111
113 proximity-sensor 113
115 top-panel 115
117 speaker 117
119 bezel-side 119
121 bezel-corner 121
123 volume-button 123
125 power-button 125
127 memory-receiver 127
129 bezel-top 129
131 noise-cancellation-microphone 131
333 backside 333

335 fingerprint-sensor 335
337 flash-lighting 337
339 dual-camera 339
341 solar-panel 341
443 antenna-hole 443
745 bezel-bottom 745
747 earphone-plug-receiver 747
749 charging-port 749
751 speaker-holes 751
753 microphone 753
800 smartphone 800
805 home-screen-button 805
817 speaker 817
1500 hardware-components 1500
1501 processors 1501
1503 baseband processor 1503
1505 application processor 1505
1507 SRAM memory 1507
1509 DRAM memory 1509
1511 NAND flash memory 1511
1513 removable memory 1513
1515 front-end-module 1515
1517 RF-transceiver 1517
1519 power-amplifier 1519
1521 antenna 1521
1523 envelope-tracking 1523
1525 front-end-module 1525
1527 RF-transceiver 1527
1529 power-amplifier 1529
1531 antenna 1531
1533 main-PMIC 1533
1535 battery 1535
1537 charger 1537
1539 NFC-reader 1539
1541 wireless-radio 1541
1543 sensors 1543
1545 electronic-compass 1545
1547 GNSS 1547
1549 port 1549
1551 lighting-system 1551
1553 solar-charging-system 1553
1555 display-PMIC 1555
1557 camera-PMIC 1557
1559 audio-codec 1559
1561 audio-amplifier 1561
1563 audio-amplifier 1563
1601 cellular/Wi-Fi network 1601
1603 LP cellular network 1603
1605 satellite network 1605
1607 LP network 1607
1609 other network 1609
1700 method 1700
1701 step of start call initiated 1701
1703 step of searching for cellular network to connect to 1703
1705 step of checking if cellular network available 1705
1707 step of establishing wireless connection 1707
1709 step of ending call 1709
1720 method 1720
1721 step of start call initiated 1721
1723 step of searching for cellular network to connect to 1723
1725 step of checking if cellular network available 1725
1727 step of establishing wireless connection 1727
1729 step of ending call 1729
1731 step of activating satellite mode 1731
1733 step of start call initiated 1733
1735 step of searching for satellite network to connect to 1735
1737 step of checking if satellite network available 1737
1739 step of establishing wireless connection 1739
1741 step of ending satellite call 1741
1750 method 1750
1751 step of checking for cellular or satellite connection 1751
1753 step of receiving choice of LP network to connect to 1753
1755 step of checking LP connection 1755
1757 step of receiving access for data communication 1757
1759 step of ending session 1759
1801 time 1801
1803 date 1803
1805 day 1805
1807 light 1807
1809 light 1809
1811 light 1811
1813 light 1813
1815 geographic-relevant-info 1815
1820 home-screen 1820
1821 virtual-button 1821
1830 apps-list-display 1830
1831 command-prompt 1831
1840 apps-list-display 1840
1850 apps-display 1850
1920 home-screen 1920
1930 apps-list-display 1930
1950 apps-display 1950

DETAILED DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

Note, the smartphones (e.g., a smartphone 100 and/or a smartphone 800) described herein and shown in the accompanying drawing figures may be mobile computing devices, with touchscreens and with telephone functionality.

Note, FIG. 1 through FIG. 7 may depict smartphone 100 from various viewing angles; whereas, FIG. 8 through FIG. 14 may depict a different smartphone 800 from various viewing angles. Further note in some embodiments, a difference between smartphone 100 and smartphone 800 may be smartphone 100's home-screen-button 105 and dummy-button 117 for speakers, which may be substantially triangular in shape, from smartphone 800's home-screen-button 805 and dummy-button 817 for speakers, which may be substantially square in shape. In some embodiments, electronics and/or hardware components of smartphone 100 may be substantially similar to those of smartphone 800.

Figure 2:
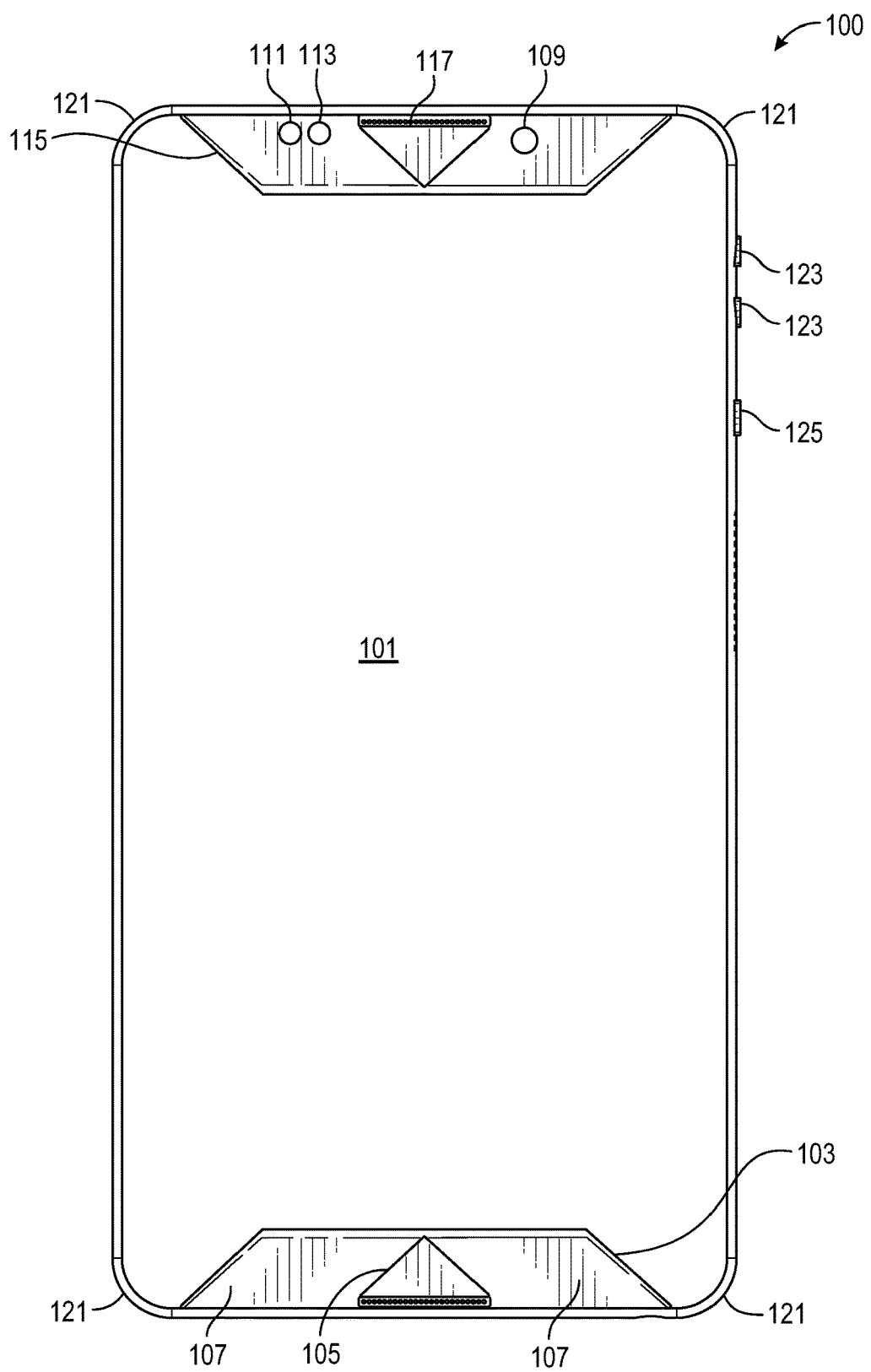
FIG. 2 may depict a front view of the smartphone of FIG. 1.
Figure 3:
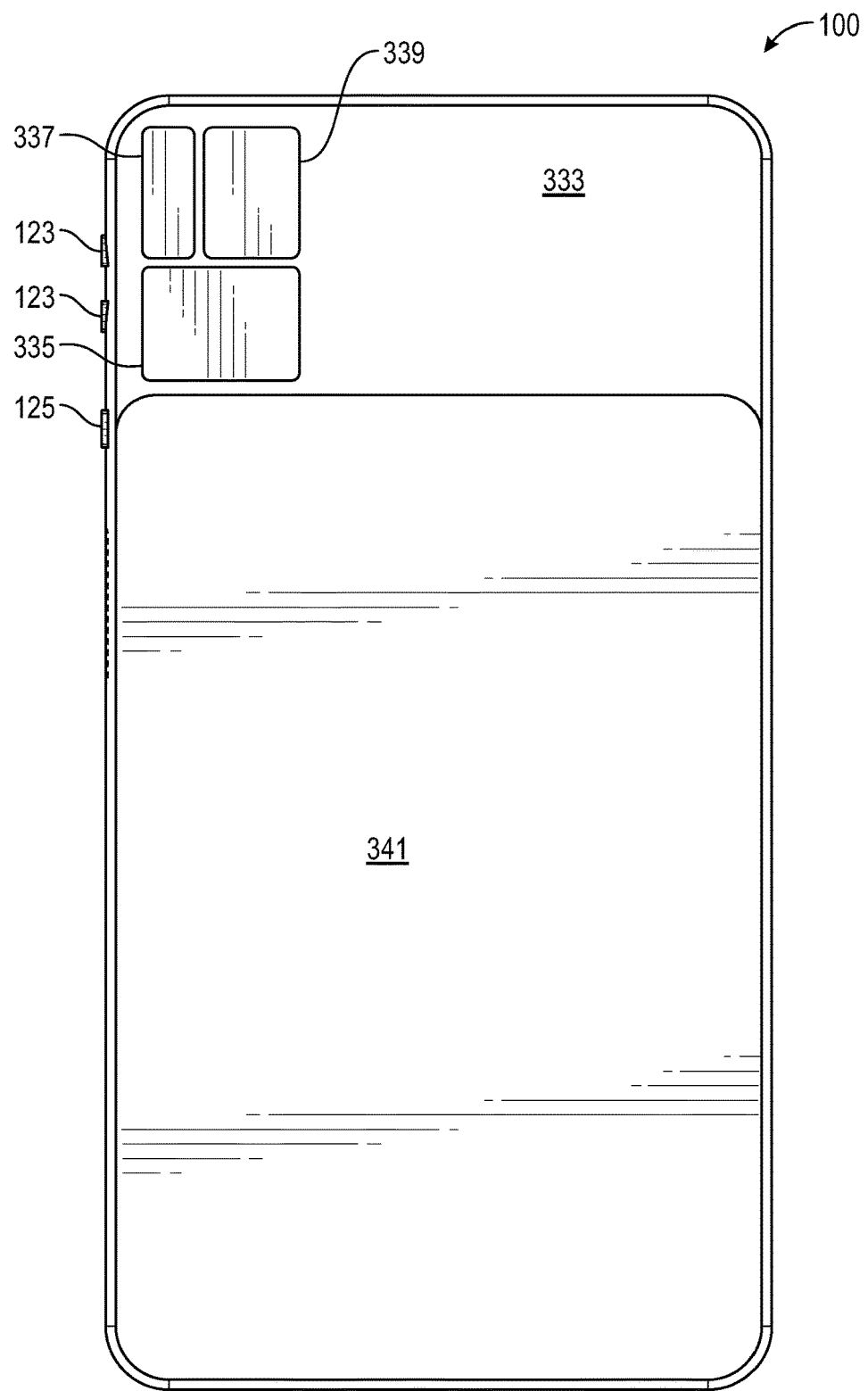
FIG. 3 may depict a rear (back) view of the smartphone of FIG. 1.
Figure 4:
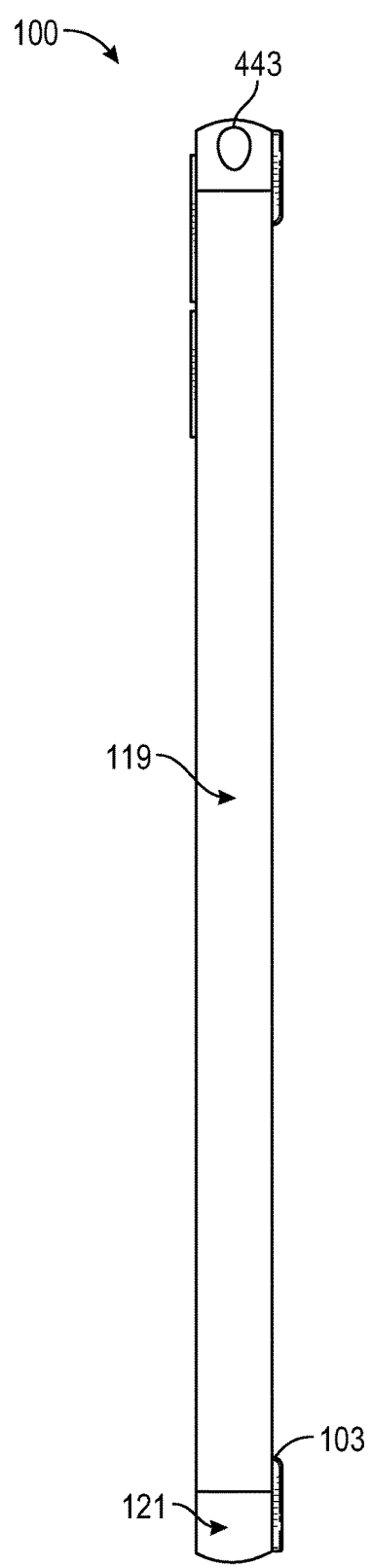
FIG. 4 may depict a left-side view of the smartphone of FIG. 1.
Figure 5:
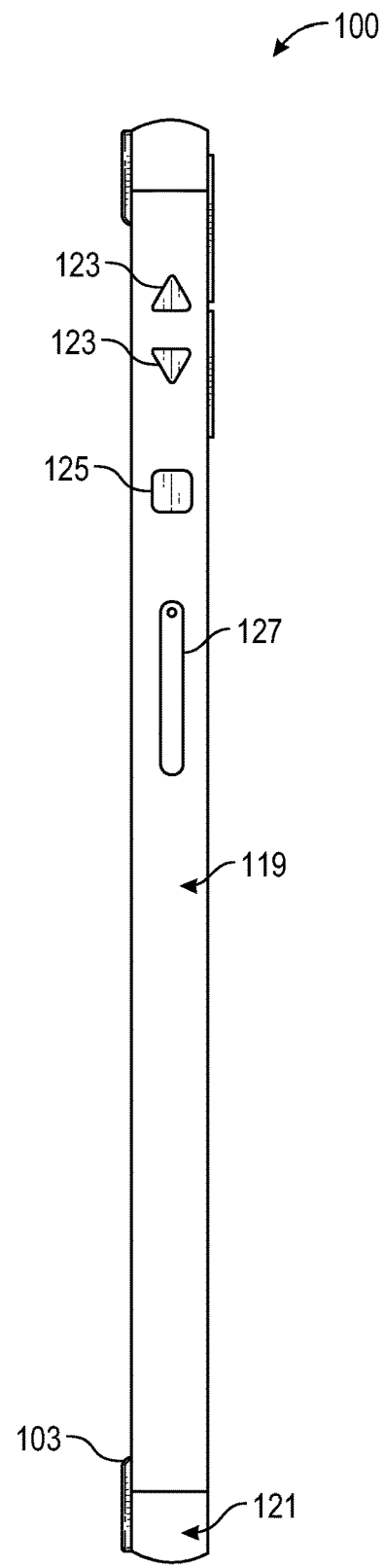
FIG. 5 may depict a right-side view of the smartphone of FIG. 1.
Figure 6:
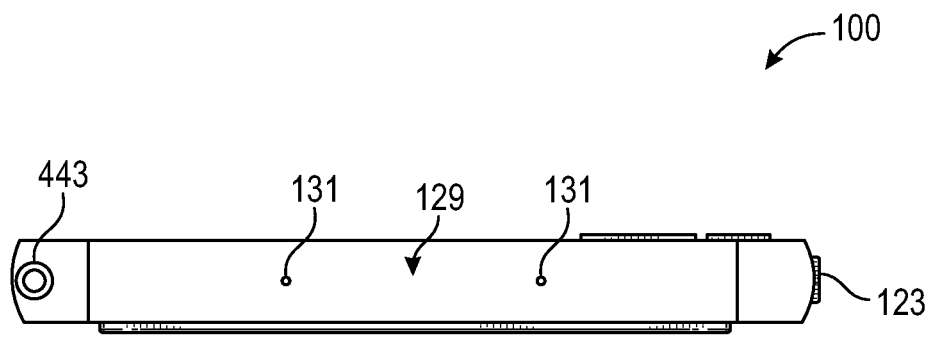
FIG. 6 may depict a top view of the smartphone of FIG. 1.
Figure 7:
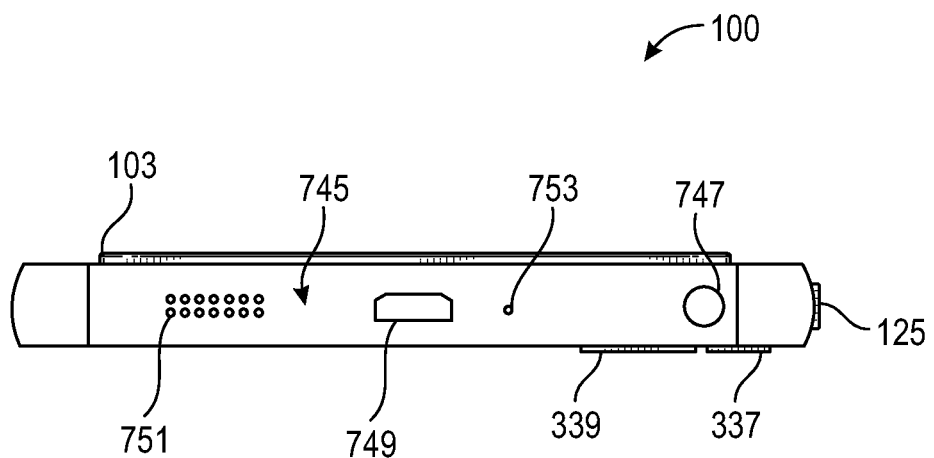
FIG. 7 may depict a bottom view of the smartphone of FIG. 1.

FIG. 1 through FIG. 7 may depict a smartphone 100 from various viewing angles. FIG. 1 may depict a front perspective view of smartphone 100. FIG. 2 may depict a front view of smartphone 100. FIG. 3 may depict a rear (back) view of smartphone 100. FIG. 4 may depict a left-side view of smartphone 100. FIG. 5 may depict a right-side view of smartphone 100. FIG. 6 may depict a top view of smartphone 100. FIG. 7 may depict a bottom view of smartphone 100.

In some embodiments, a front of smartphone 100 may comprise a touchscreen 101. In some embodiments, touchscreen 101 may occupy a majority of surface area of the front of smartphone 100. In some embodiments, touchscreen 101 may display outputs, graphics, icons, animations, videos, virtual-buttons, graphical-user-interface (GUI), and/or the like. In some embodiments, touchscreen 101 may receive various inputs from a user, such as, but not limited to, finger touches, finger swipes, stylus touches, stylus swipes, and/or the like. In some embodiments, touchscreen 101 may be constructed from one or more layers of substantially transparent glass and/or plastic. See e.g., FIG. 1 and FIG. 2.

In some embodiments, a front of smartphone 100 may comprise a bottom-panel 103. With respect to the front of smartphone 100, bottom-panel 103 may be located at a bottom of smartphone 100. In some embodiments, bottom-panel 103 may be shaped substantially as a trapezoid. In some embodiments, a home-screen-button 105 may be located and/or accessible from bottom-panel 103. In some embodiments, bottom-panel 103 may display outputs, graphics, icons, animations, videos, virtual-button(s) 107 and/or the like. In some embodiments, bottom-panel 103 may receive various inputs from a user, such as, but not limited to, finger touches, finger swipes, stylus touches, stylus swipes, and/or the like. In some embodiments, bottom-panel 103 may be constructed from one or more layers of substantially transparent glass and/or plastic. See e.g., FIG. 1 and FIG. 2.

In some embodiments, home-screen-button 105 may be located and/or accessible from bottom-panel 103. In some embodiments, engagement of home-screen-button 105 may cause touchscreen 101 to display a home page screen. See e.g., FIG. 18C and/or FIG. 19A for examples of home page screens that could be displayed on touchscreen 101 if home-screen-button 105 may have been engaged. See e.g., FIG. 1 and FIG. 2 for home-screen-button 105.

In some embodiments, virtual-button(s) 107 may be located and/or accessible from bottom-panel 103. For example, FIG. 1 and FIG. 2 may show a virtual-button located to both the left and the right of home-screen-button 105 in bottom-panel 103. In some embodiments, virtual-button 107 may act as a "return" or "back" button. In some embodiments, virtual-button 107 may act to bring up (e.g., load and display on touchscreen 101) a last used "app."; wherein "app," may stand for a software application that may used and/or accessible from smartphone 100. In some embodiments, a left side virtual-button 107 may function as the bring up last app button. In some embodiments, a left side (or left side in some other embodiments) virtual-button 107 may function to bring up a call keypad on touchscreen 101. In some embodiments, a right side (or left side in some other embodiments) virtual-button 107 may function as the "return" or the "back" button. In some embodiments, other functions may be mapped and/or assigned to virtual-button(s) 107.

In some embodiments, a front of smartphone 100 may comprise a top-panel 115. With respect to the front of smartphone 100, top-panel 115 may be located at a top of smartphone 100. In some embodiments, top-panel 115 may be shaped substantially as a trapezoid. In some embodiments, a speaker 117 may be located in top-panel 115. In some embodiments, top-panel 115 may comprise a front-camera 109 (e.g., a front facing camera). In some embodiments, top-panel 115 may comprise a light-sensor 111. In some embodiments, top-panel 115 may comprise a proximity-sensor 113. In some embodiments, light-sensor 111 and proximity-sensor 113 may function together providing light sensing and/or proximity sensing functions. In some embodiments, top-panel 115 may be constructed from one or more layers of substantially transparent glass and/or plastic. See e.g., FIG. 1 and FIG. 2.

In some embodiments, shapes of bottom-panel 103 and top-panel 115 may be substantially similar. In some embodiments, dimensions of bottom-panel 103 and top-panel 115 may be substantially similar. In some embodiments, exterior looks of bottom-panel 103 and top-panel 115 may be substantially similar. See e.g., FIG. 1 and FIG. 2.

In some embodiments, speaker 117 may be located in a dummy button. In some embodiments, a shape of this dummy button may be substantially similar to a shape of home-screen-button 105. In some embodiments, dimensions of this dummy button may be substantially similar to dimensions of home-screen-button 105. In some embodiments, exterior looks of this dummy button may be substantially similar to exterior looks of home-screen-button 105. See e.g., FIG. 1 and FIG. 2.

In some embodiments, a bezel may run around an outside perimeter of smartphone 100. In some embodiments, this bezel may comprise bezel-side 119, bezel-corners 121, bezel-top 129, and bezel-bottom 745. In some embodiments, smartphone 100 may comprise two opposing bezel-sides 119, space apart from either by a width of smartphone 100. In some embodiments, bezel-top 129 and bezel-bottom 745 may be opposed from each other, spaced apart from each other by an overall length of smartphone 100 (not including when an antenna may be extended). In some embodiments, the bezel perimeter of smartphone 100 may run from bezel-side 119 (e.g., right side), to a bezel-corner 121 (e.g., upper right corner), to bezel-top 129, to bezel-corner 121 (e.g., upper left corner), to bezel-side 119 (e.g., left side), to bezel-corner 121 (e.g., lower left corner), to bezel-bottom 745, to bezel-corner 121 (e.g., lower right corner), back to the starting bezel-side 119 (e.g., the right side). In some embodiments, touchscreen 101, bottom-panel 103, and/or top-panel 115 may be captured within this bezel. See e.g., FIG. 1, FIG. 2, FIG. 4, FIG. 5, FIG. 6, and FIG. 7.

In some embodiments, volume-button(s) 123 may be located and/or accessible from bezel-side 119. In some embodiments, there may be two such volume-buttons 123, one for raising the volume and one for lowering the volume. In some embodiments, volume-button(s) 123 may be up or down selection buttons, i.e., for moving up or down in a given menu being displayed on touchscreen 101. In some embodiments, volume-button(s) 123 may be substantially triangular in shape. In some embodiments, an exterior surface of volume-button(s) 123 may extend beyond an exterior surface of bezel-side 119, to facilitate tactile location and engagement by the user. See e.g., FIG. 1 through FIG. 7, but not FIG. 4 nor FIG. 7 for volume-button(s) 123.

In some embodiments, power-button 125 may be located and/or accessible from bezel-side 119. In some embodiments, power-button 125 may be a device (smartphone 100) power on or power off button. In some embodiments, power-button 125 may be a reset button. In some embodiments, power-button 125 may be substantially square in shape. In some embodiments, an exterior surface of power-button 125 may extend beyond an exterior surface of bezel-side 119, to facilitate tactile location and engagement by the user. See e.g., FIG. 1 through FIG. 7, but not FIG. 4 nor FIG. 6 for power-button 125.

In some embodiments, memory-receiver 127 may be located and/or accessible from bezel-side 119. In some embodiments, memory-receiver 127 may be slot for removably receiving a memory card, such as, but not limited to, a SIM (subscriber identity module) card. See e.g., FIG. 1 and FIG. 5.

In some embodiments, noise-cancellation-microphone(s) 131 may be located on/in bezel-top 129. As their name implies, noise-cancellation-microphone(s) 131 may be noise cancellation microphone for audio inputs into smartphone 100. See e.g., FIG. 1 and FIG. 6.

FIG. 3 may show a backside 333 (rear side) of smartphone 100. In some embodiments, backside 333 of smartphone 100 may comprise fingerprint-sensor 335, flash-lighting 337, dual-camera 339, and/or solar-panel 341. In some embodiments, fingerprint-sensor 335 may be used for biometric functions, such as, but not limited to, locking and/or unlocking smartphone 100. In some embodiments, flash-lighting 337 may be one or more LEDs (light emitting diodes). In some embodiments, flash-lighting 337 may provide flashlight functionality to smartphone 100. In some embodiments, flash-lighting 337 may provide flash lighting functionality for when dual-cameras 339 may be in use. In some embodiments, dual-cameras 339 may be rear facing cameras. In some embodiments, solar-panel 341 may capture photonic (e.g., solar) energy and convert such captured photonic energy into electrical power for use by smartphone 100. For example, and without limiting the scope of the present invention, solar-panel 341 may be used to provide charging electrical power to battery 1535 (see e.g., FIG. 15 for battery 1535). In some embodiments, smartphone 100 (and/or smartphone 800) may comprise at least one region of solar panel 341 located on a backside 333; wherein the backside 333 may be opposed to the front. In some embodiments, the at least one region of solar panel 341 may occupy a majority of surface area of backside 333. In some embodiments, the at least one region of solar panel 341 may be used to at least partially charge a battery 1535 of smartphone 100 (and/or smartphone 800). See e.g., FIG. 3 for backside 333, fingerprint-sensor 335, flash-lighting 337, dual-camera 339, and solar-panel 341.

Figure 15:
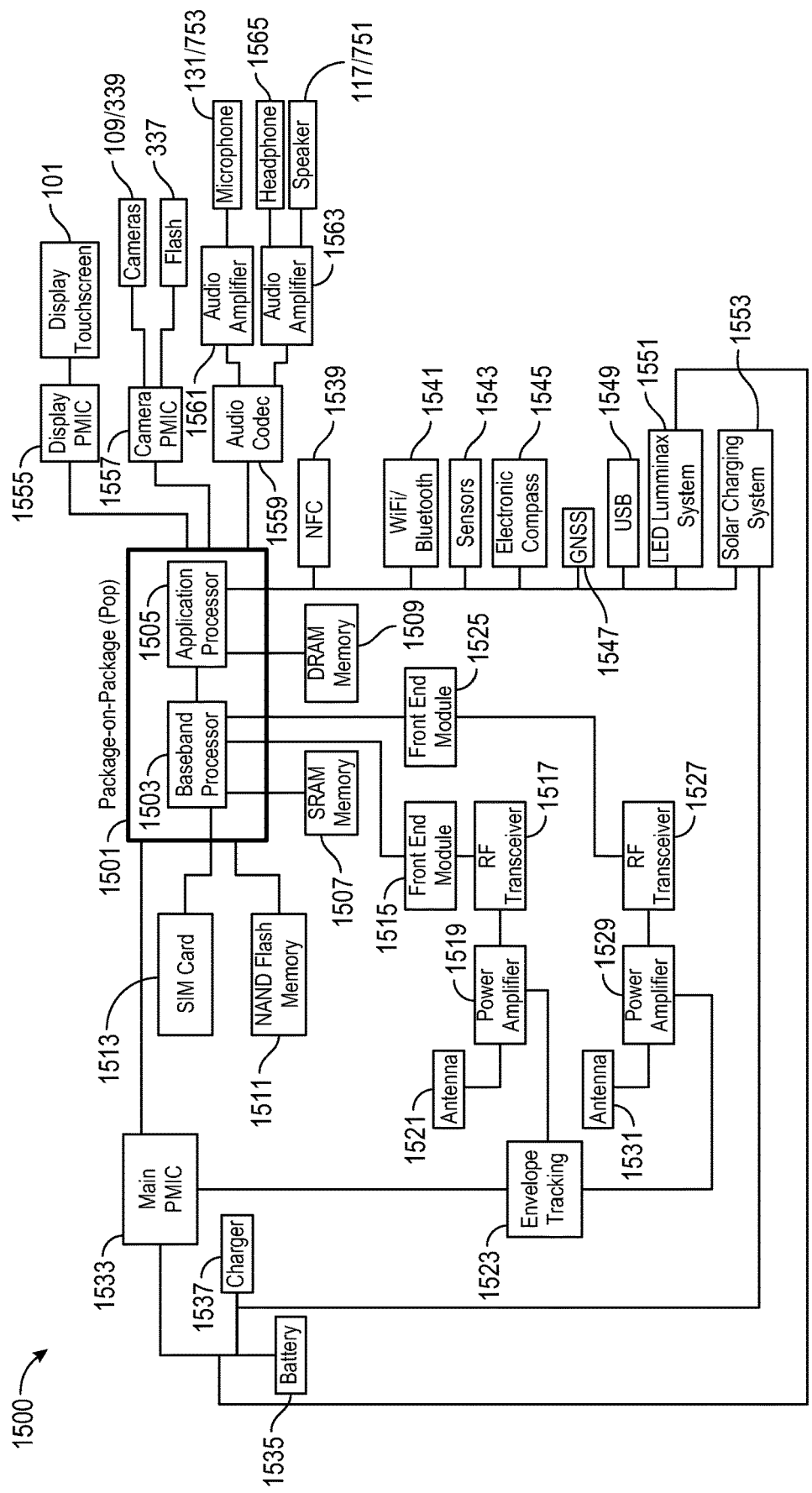
FIG. 15 may depict a block diagram showing electronics and hardware components of the smartphones shown in FIG. 1 through FIG. 14.

In some embodiments, antenna-hole 443 may be an antenna access hole for a cylinder (silo) for housing a given antenna, such as, but not limited to antenna 1521 or antenna 1531 (see e.g., FIG. 15 for antenna 1521 or antenna 1531). In some embodiments, antenna 1521 or antenna 1531 may retractably extend in and out of antenna-hole 443. See e.g., FIG. 4 and FIG. 6 for antenna-hole 443.

In some embodiments, located on and/or in bezel-bottom 745 may be one or more of: earphone-plug-receiver 747, charging-port 749, speaker-holes 751, microphone 753, and/or the like. In some embodiments, earphone-plug-receiver 747 may be for receiving a plug or jack of headphones (i.e., earphones, earbuds, and the like). In some embodiments, charging-port 749 may be for receiving a plug or a jack of a cable (or cord or the like) that may be for providing electrical power to smartphone 100; and/or wherein that cable may be for communication (such as, but not limited to, transferring data) between smartphone 100 and some other computing device (or memory/storage device). In some embodiments, charging-port 749 may be configured to a preexisting power/communication standard, such as, but not limited to, USB, USB micro, or the like. In some embodiments, charging-port 749 may be configured for a proprietary power/communication standard. In some embodiments, speaker-holes 751 (and/or speaker 117) may facilitate audio outputs of smartphone 100. In some embodiments, microphone 753 may allow external sounds to be received/captured as inputs by smartphone 100. See e.g., FIG. 7.

Figure 8:
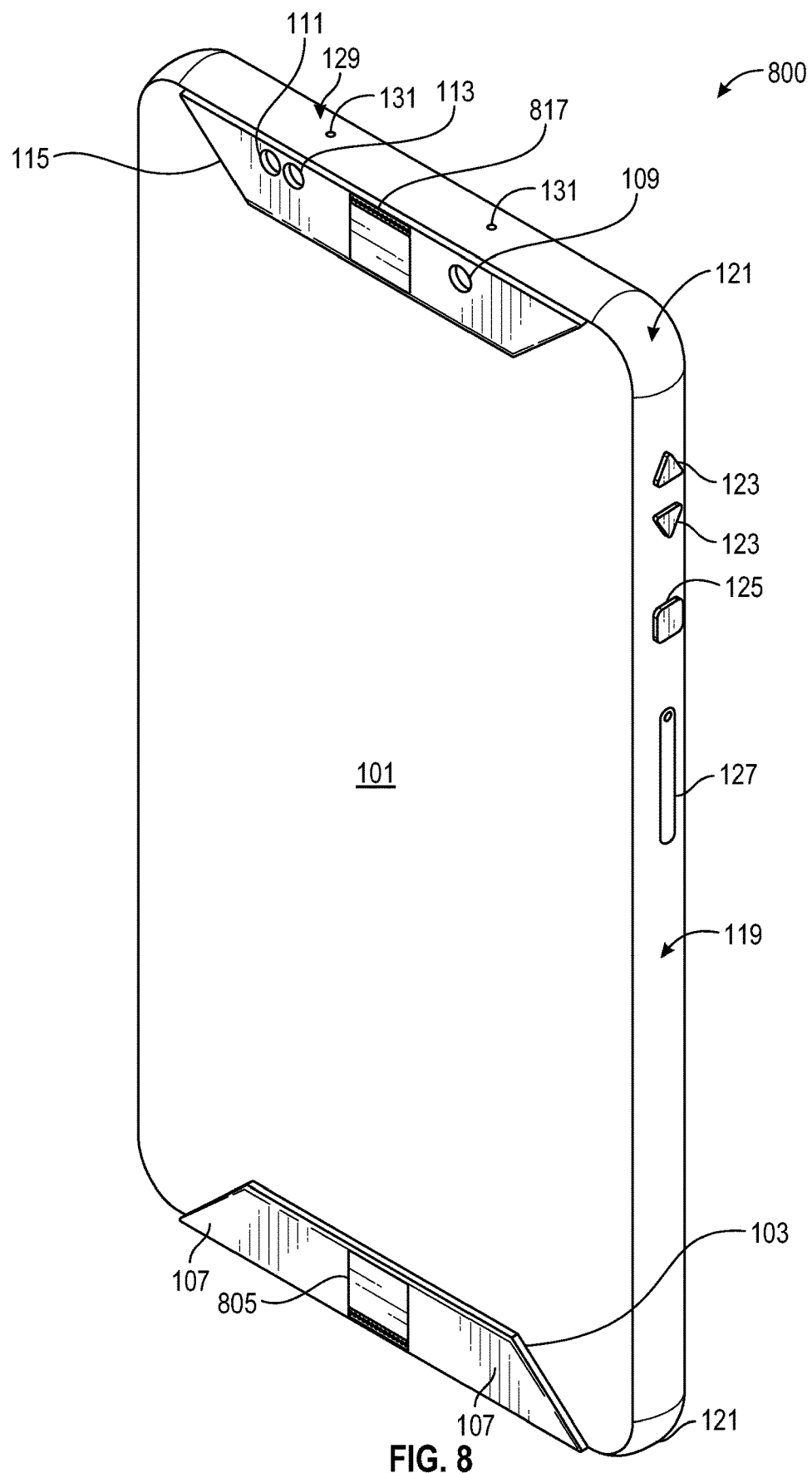
FIG. 8 may depict a front perspective view of a smartphone according to one embodiment.
Figure 9:
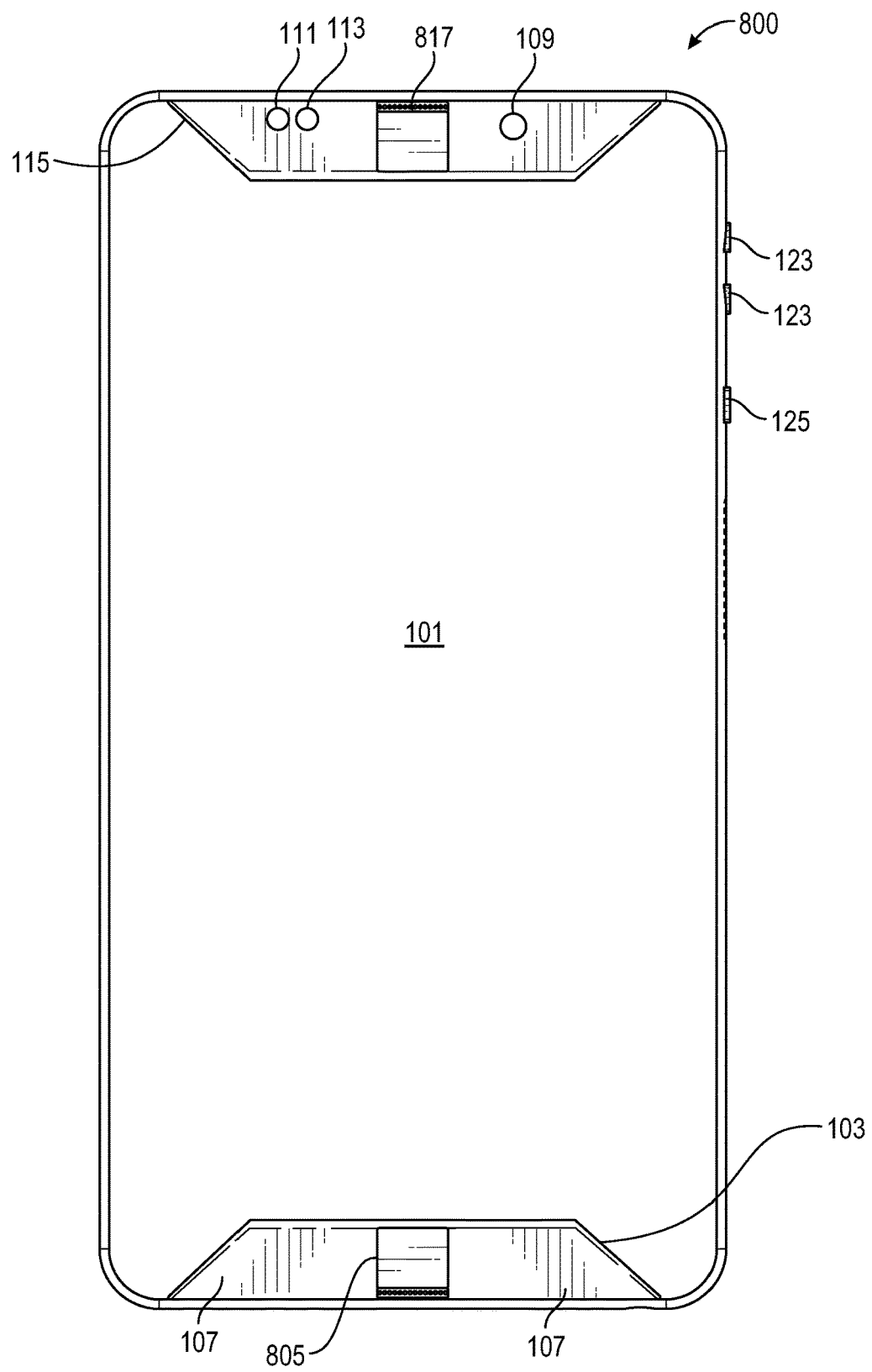
FIG. 9 may depict a front view of the smartphone of FIG. 8.
Figure 10:
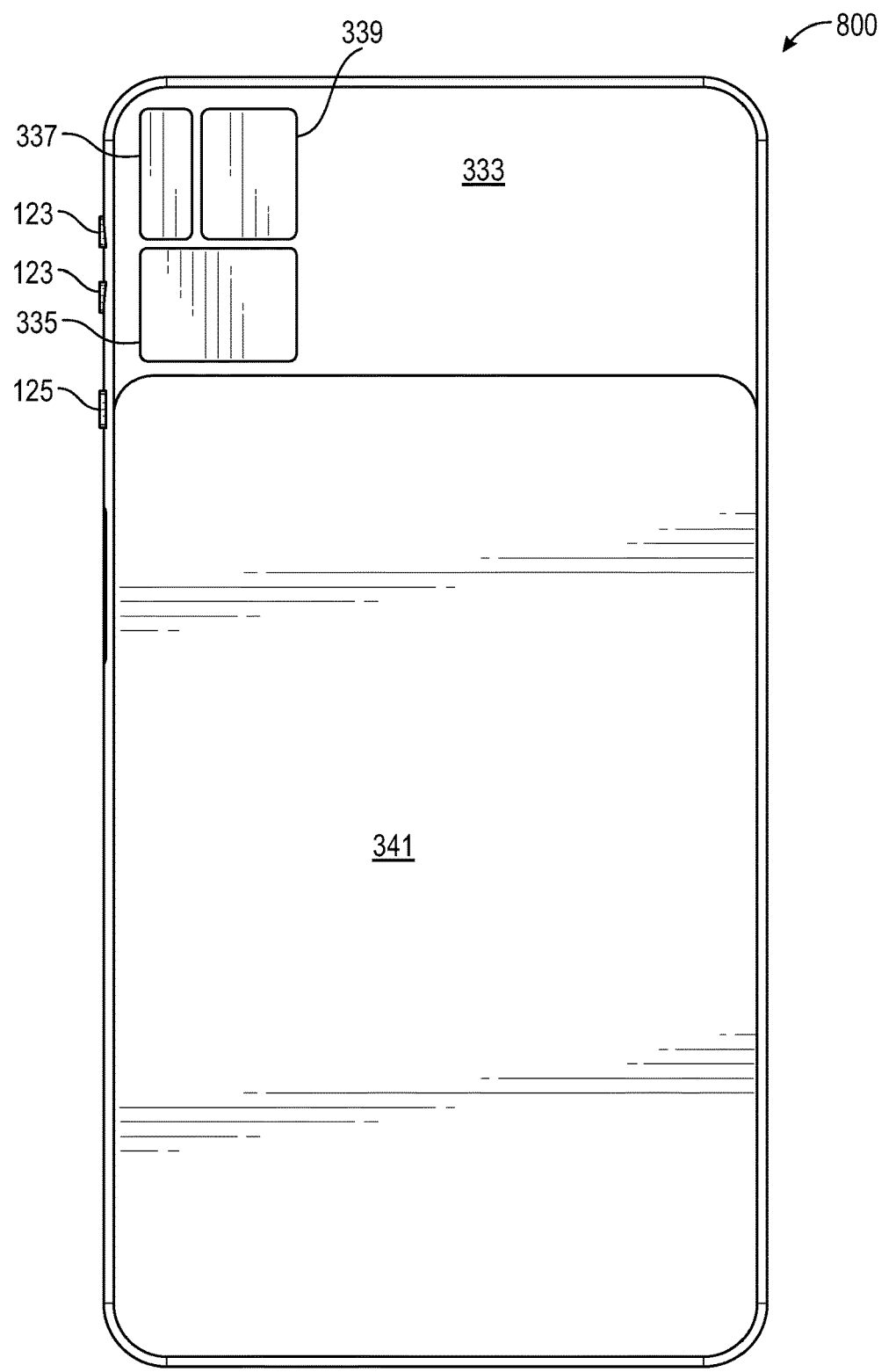
FIG. 10 may depict a rear (back) view of the smartphone of FIG. 8.
Figure 11:
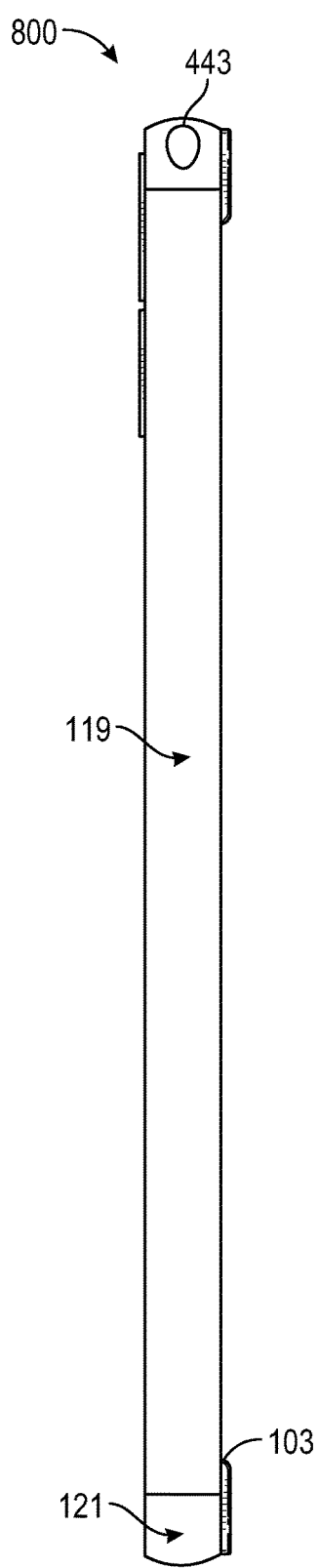
FIG. 11 may depict a left-side view of the smartphone of FIG. 8.
Figure 12:
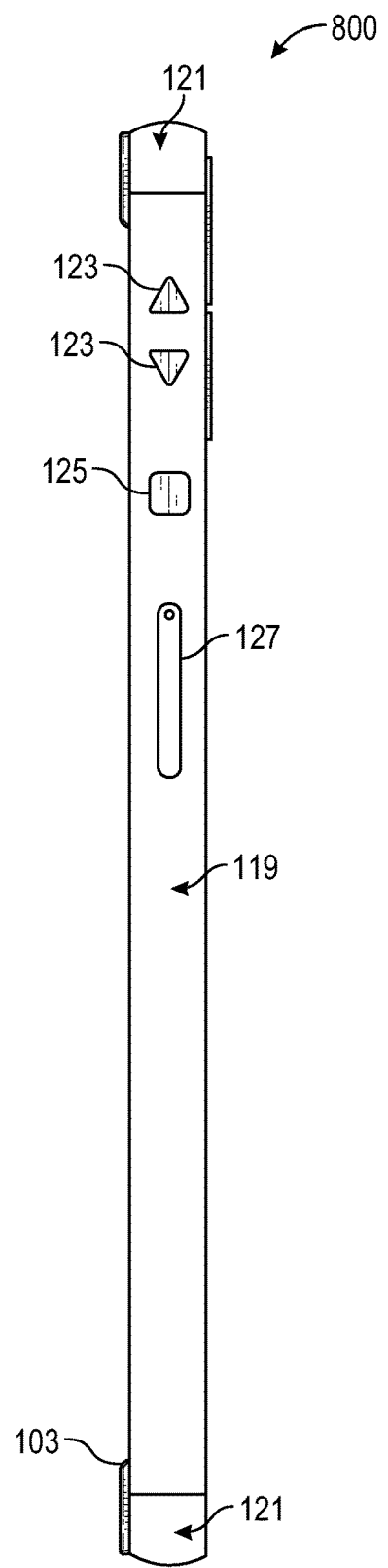
FIG. 12 may depict a right-side view of the smartphone of FIG. 8.
Figure 13:
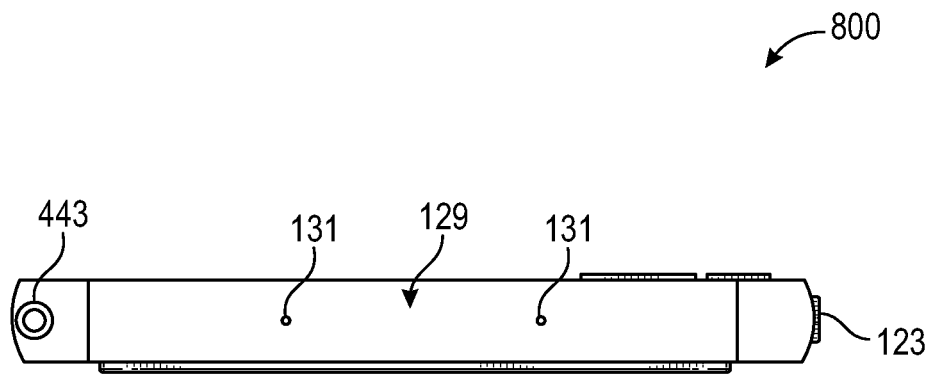
FIG. 13 may depict a top view of the smartphone of FIG. 8.
Figure 14:
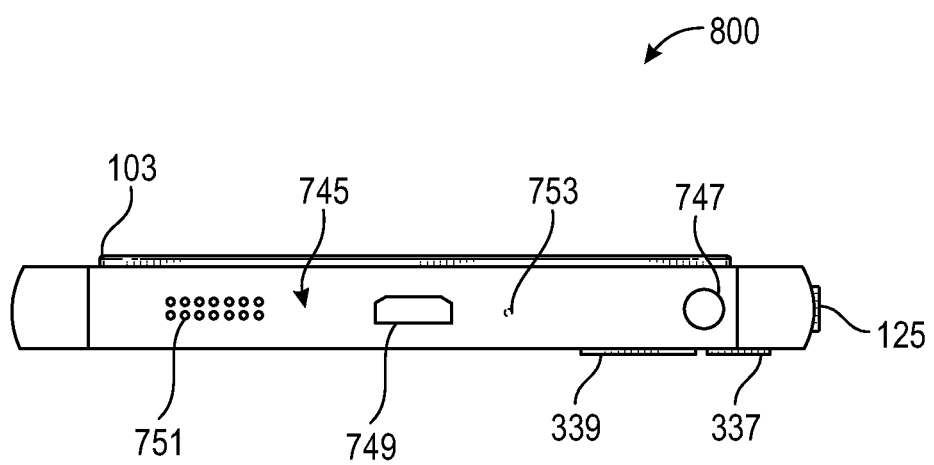
FIG. 14 may depict a bottom view of the smartphone of FIG. 8.

FIG. 8 through FIG. 14 may depict a different smartphone 800 from various viewing angles. FIG. 8 may depict a front perspective view of smartphone 800. FIG. 9 may depict a front view of smartphone 800. FIG. 10 may depict a rear (back) view of smartphone 800. FIG. 11 may depict a left-side view of smartphone 800. FIG. 12 may depict a right-side view of smartphone 800. FIG. 13 may depict a top view of smartphone 800. FIG. 14 may depict a bottom view of smartphone 800.

In some embodiments, smartphone 800 may be substantially similar to smartphone 100 in terms of functionality, performance, size, dimensions, and overall exterior look. In some embodiments, smartphone 800 may differ from smartphone 100 by different shaped home-screen-buttons (and the corresponding top dummy button with the speakers). For example, and without limiting the scope of the present invention, smartphone 800 may comprise home-screen-button 805, which may be shaped substantially as a square. Whereas, in some embodiments, home-screen-button 105 in smartphone 100 may be substantially shaped as a triangle. Aside from the shape of the home-screen-button 805, home-screen-button 805 may function substantially the same as home-screen-button 105. Similarly, a dummy button that may house speaker 817 may be shaped substantially similarly as home-screen-button 805. Other than these differences, smartphone 100 may be substantially similar to smartphone 800. Aside from the shape of the dummy button of speaker 817, speaker 817 may function substantially the same as speaker 117. For this reason, many of the reference numerals used in FIG. 1 through FIG. 7 for smartphone 100 are also used in FIG. 8 through FIG. 14 for smartphone 800.

FIG. 15 may depict a block diagram showing electronics and hardware-components 1500 of the smartphones (e.g., 100 and/or 800) shown in FIG. 1 through FIG. 14. In some embodiments, smartphone 100 may comprise hardware-components 1500. In some embodiments, smartphone 800 may comprise hardware-components 1500.

Discussing FIG. 15, in some embodiments, hardware-components 1500 may comprise one or more of: processors 1501, baseband processor 1503, application processor 1505, memory, SRAM memory 1507, NAND flash memory 1511, removable memory 1513, front-end-module 1515, RF-transceiver 1517, power-amplifier 1519, antenna 1521, envelope-tracking 1523, front-end-module 1525, RF-transceiver 1527, power-amplifier 1529, antenna 1531, main-PMIC 1533 (power management integrated circuit), battery 1535, charger 1537, NFC-reader 1539 (near field communication), wireless-radio 1541, sensors 1543 (e.g., light-sensor 111, proximity-sensor 113, fingerprint-sensor 335, etc.), electronic-compass 1545, GNSS 1547, port 1549 (which may be charging port 749 in some embodiments), lighting-system 1551, solar-charging-system 1553, display-PMIC 1555, camera-PMIC 1557, audio-codec 1559, audio-amplifier 1561, audio-amplifier 1563, touchscreen 101 (display), camera 109, camera 339, flash-lighting 337, microphones 131, microphone 753, speaker 117, speaker 751, speaker 817, volume-button(s) 123, power-button 125, home-screen-button 105, home-screen-button 805, and/or the like. See e.g., FIG. 15. In some embodiments, various hardware-components 1500 may be in electrical and/or optical communication with each other. In some embodiments, one or more of these hardware-components 1500 may not be technically hardware, but rather implemented via software (or firmware) that mimics such hardware functionality.

Processor 1501 may be one or more processors, including one or more: central processors, processors for graphics, processors for applications (e.g., "mobile apps"), processor for network communications, and/or the like. In some embodiments, Processor(s) 1501 may comprise one or more of: baseband processor(s) 1503 and/or application processor(s) 1505. In some embodiments, when "Processor(s) 1501" terminology may be used herein, such disclosure may be applicable to baseband processor(s) 1503 and/or application processor(s) 1505. In some embodiments, Processor 1501 may be in communication with the Memory. In some embodiments, the Memory may comprise SRAM memory 1507, DRAM memory 1509, NAND flash memory 1511, removable memory 1513, and/or the like. In some embodiments, removable memory 1513 may be or may comprise a SIM card. In some embodiments, Processor 1501 may be in communication with I/O (input/output) Means.

In some embodiments, the inputs of the I/O Means may be one or more inputs selected from: camera(s) (e.g., 109 and/or 339) of the smartphone (e.g., 100 and/or 800); scanned images from fingerprint-sensor 335 and/or from the camera(s) (e.g., 109 and/or 339) of the smartphone (e.g., 100 and/or 800); buttons (e.g., 105, 107, 123, 125, and/or 805) of the smartphone (e.g., 100 and/or 800); sensors 1543 of the smartphone (e.g., 100 and/or 800); light-sensor 111 of the smartphone (e.g., 100 and/or 800); proximity-sensor 113 of the smartphone (e.g., 100 and/or 800); switches of the smartphone (e.g., 100 and/or 800); touchscreen 101 of the smartphone (e.g., 100 and/or 800); motion detector (e.g., accelerometer) (e.g., a type of sensor 1543) of the smartphone (e.g., 100 and/or 800); charging-port 749 of the smartphone (e.g., 100 and/or 800); hardwired data ports (e.g., a USB port or the like) of the smartphone (e.g., 100 and/or 800); incoming communications received at antennas (e.g., 1521 and/or 1531) of the smartphone (e.g., 100 and/or 800); incoming communications received at wireless-radio 1541 of the smartphone (e.g., 100 and/or 800); stylus of the smartphone (e.g., 100 and/or 800); microphones (e.g., 131 and/or 753) of the smartphone (e.g., 100 and/or 800); and/or the like.

In some embodiments, the outputs of I/O Means may be one or more outputs selected from: content displayed on touchscreen 101 of the smartphone (e.g., 100 and/or 800); sounds from speakers (e.g., 117, 751, and/or 817) of the smartphone (e.g., 100 and/or 800); lights from lighting-system 1551 of the smartphone (e.g., 100 and/or 800); outgoing information transmitted via the hardwired port (e.g., a USB port or the like) of the smartphone (e.g., 100 and/or 800); outgoing information transmitted via the antennas (e.g., 1521 and/or 1531) of the smartphone (e.g., 100 and/or 800); outgoing information transmitted via wireless-radio 1541 of the smartphone (e.g., 100 and/or 800); and/or the like.

Continuing discussing FIG. 15, in some embodiments, Processor 1501 (including baseband processor(s) 1503 and/or application processor(s) 1505, in some embodiments) may execute a computer program known as an operating system (e.g., a Microsoft Windows operating system, a Linux operation system, a mobile computing device operating system, an Android operating system, a proprietary operating system, any other suitable operating system, and/or combinations thereof) which may control the execution of other computer programs (e.g., application programs ["mobile apps"]); and may provide for scheduling, input/output control, hardware-component 1500 control, accounting, compilation, storage assignment, data management, memory management, communication; and/or dataflow control. Collectively, Processor 1501 and the operating system may define a computer platform for which the application programs and other computer program languages may be written in. In some embodiments, Processor 1501 may also execute one or more computer programs to implement various functions and/or method of the present invention. These computer programs may be written in any type of computer program language, including, but not limited to, a procedural programming language, object-oriented programming language, macro language, and/or combinations thereof.

These computer programs, including the operating system and/or mobile apps, may be stored in the Memory. In some embodiments, the Memory may comprise SRAM memory 1507, DRAM memory 1509, NAND flash memory 1511, removable memory 1513, and/or the like. In some embodiments, the Memory may store (hold) information on a volatile or non-volatile medium, and may be fixed and/or removable. In some embodiments, the Memory may include a tangible computer readable and computer writable nonvolatile recording medium, on which signals are stored that define a computer program or information to be used by the computer program. The recording medium may, for example, be disk memory, flash memory, and/or any other article(s) of manufacture usable to record and store information (in a non-transitory fashion). In some embodiments, in operation, Processor 1501 (including baseband processor(s) 1503 and/or application processor(s) 1505, in some embodiments) may cause(s) data, information, and/or computer programs to be read from the nonvolatile recording medium into a volatile memory (e.g., a random access memory, or RAM) that may allow for more efficient (i.e., faster) access to the information by the Processor 1501 as compared against the nonvolatile recording medium. Such memory may be located in the Memory and/or in Processor 1501. See e.g., FIG. 15. The Processor 1501 may manipulate(s) the data within integrated circuit memory and may then copy the data to the nonvolatile recording medium after processing may be completed. A variety of mechanisms are known for managing data movement between the nonvolatile recording medium and the integrated circuit memory element, and the invention is not limited to any mechanism, whether now known or later developed. The invention is also not limited to a particular processing unit or storage unit (memory unit).

Continuing discussing FIG. 15, in some embodiments, baseband processor(s) 1503 may handle, manage, and/or control communications through the antenna(s) (e.g., 1521 and/or 1531). In some embodiments, application processor(s) 1505 may handle, manage, and/or control communications through the wireless-radio 1541. In some embodiments, application processor(s) 1505 may handle, manage, and/or control the various software, computer programs, and the like, such as, but not limited to "mobile apps" accessible from smartphone 100 (and/or smartphone 800). In some embodiments, SRAM memory 1507 may be static random access memory and may be used in relation to processing on baseband processor(s) 1503. In some embodiments, removable memory 1513 may refer to memory that may be removable from the smartphone (e.g., 100 and/or 800). In some embodiments, removably memory 1513 may be used in relation to processing on baseband processor(s) 1503. In some embodiments, removably memory 1513 may be a SIM card. In some embodiments, DRAM memory 1509 may be dynamic random access memory and may be used in relation to processing on application processor(s) 1505. In some embodiments, NAND flash memory 1511 may be nonvolatile memory used in relation to processing of Processor(s) 1501. See e.g., FIG. 15.

New and/or updates to code, programs, computer programs, software applications, operating system, firmware, and/or mobile apps may be saved non-transitorily onto the Memory via the I/O Means (e.g., via charging-port 749) and/or via incoming external communications received at the antenna(s) (e.g., 1521 and/or 1531) and/or received at the wireless-radio 1541.

Continuing discussing FIG. 15, in some embodiments, Processor(s) 1501 may be in communication with: SRAM memory 1507, DRAM memory 1509, NAND flash memory 1511, removable memory 1513, front-end-module 1515, front-end-module 1525, main-PMIC 1533, NFC-reader 1539, wireless-radio 1541, sensors 1543, electronic-compass 1545, GNSS 1547, port 1549, lighting-system 1551, solar-charging-system 1553, display-PMIC 1555, camera-PMIC 1557, audio-codec 1559, and/or the like. In some embodiments, Processor(s) 1501 may manage and/or control such hardware-components 1500 according to the executable code/instructions running on Processor(s) 1501. See e.g., FIG. 15.

Continuing discussing FIG. 15, in some embodiments, baseband processor(s) 1503 may be in communication with: application processor(s) 1505, SRAM memory 1507, removable memory 1513, front-end-module 1515, front-end-module 1525, and/or the like. In some embodiments, baseband processor(s) 1503 may manage and/or control such hardware-components 1500 according to the executable code/instructions running on baseband processor(s) 1503. See e.g., FIG. 15.

Continuing discussing FIG. 15, in some embodiments, application processor(s) 1505 may be in communication with: baseband processor(s) 1503, DRAM memory 1509, NFC-reader 1539, wireless-radio 1541, sensors 1543, electronic-compass 1545, GNSS 1547, port 1549, lighting-system 1551, solar-charging-system 1553, and/or the like. In some embodiments, application processor(s) 1505 may manage and/or control such hardware-components 1500 according to the executable code/instructions running on Processor(s) 1501. See e.g., FIG. 15.

In some embodiments, smartphone 100 (and/or smartphone 800) may comprise at least three different communication circuits, a first-communication-circuit, a second-communication-circuit, and a third-communication-circuit. In some embodiments, hardware-components 1500 may comprise at least three different communication circuits, a first-communication-circuit, a second-communication-circuit, and a third-communication-circuit. In some embodiments, the first-communication-circuit may be in removable wireless communication with a cellular network (such as cellular/Wi-Fi network 1601). In some embodiments, the second-communication-circuit may be in removable wireless communication with a satellite-network (such as satellite network 1605). In some embodiments, the third-communication-circuit may be in removable wireless communication with the internet. In some embodiments, one or more of the at least three different communication circuits may facilitate wireless data transmission. In some embodiments, one or more of the at least three different communication circuits may facilitate voice phone calls (e.g., as in cell phone calls).

In some embodiments, baseband processor(s) 1503 may be at least one baseband processor 1503. In some embodiments, at least one baseband processor 1503 may be in communication with the first-communication-circuit. In some embodiments, the at least one baseband processor 1503 may be in communication with the second-communication-circuit.

In some embodiments, application processor(s) 1505 may be at least one application processor 1505. In some embodiments, at least one application processor 1505 may be in communication with the third-communication-circuit. In some embodiments, at least one application processor 1505 may be in communication with at least one baseband processor 1503. See e.g., FIG. 15.

In some embodiments, touchscreen 101 may be in communication with a display-power-management-integrated circuit 1555 that may be in communication one or more of the at least one baseband processor 1503 and/or the at least one application processor 1505. See e.g., FIG. 15.

In some embodiments, the first-communication-circuit may comprise a first radio-frequency transceiver (e.g., RF-transceiver 1517), a first power-amplifier (e.g., power-amplifier 1519), and a first antenna (e.g., antenna 1521). In some embodiments, the second-communication-circuit may be for satellite communications. In some embodiments, the second-communication-circuit may comprise a second radio-frequency transceiver (RF-transceiver 1527), a second power-amplifier (e.g., power-amplifier 1529), and a second antenna (e.g., antenna 1531). In some embodiments, the second antenna (e.g., antenna 1531) may be substantially extendable out from an antenna-hole 443 beyond a top of smartphone 100 (and/or smartphone 800) (e.g., bezel-top 129); wherein when the second antenna (e.g., antenna 1531) may not be substantially extended, the second antenna (e.g., antenna 1531) may be housed substantially internally in smartphone 100 (and/or smartphone 800).

Continuing discussing FIG. 15, in some embodiments, front-end-module 1515 may be in communication with Processor(s) 1501, baseband processor(s) 1503, and/or RF-transceiver 1517 (wherein the "RF" may be an abbreviation for "radio frequency"). In some embodiments, RF-transceiver 1517 may be in communication with power-amplifier 1519. In some embodiments, power-amplifier 1519 may be in communication with antenna 1521. In some embodiments, power-amplifier 1519 may be in communication with envelope-tracking 1523. In some embodiments, antenna 1521 may be for external radio frequency based communications. In some embodiments, antenna 1521 may be for receiving and transmitting radio frequency based communications. In some embodiments, antenna 1521 may be at least partially constructed from graphene. In some embodiments, antenna 1521 may be removably and/or extendedly housed within the antenna silo that has antenna-hole 443. In some embodiments, wherein antenna 1521 may be extendable, this may facilitate communications with satellites and/or satellite networks. In some embodiments, antenna 1521 may be for communications via one or more of: Link 1, Link 2, Link 3, Link 5, and/or Link 6, as such "Links" may be shown in FIG. 16. In some embodiments, RF-transceiver 1517 may be in communication with antenna 1521. In some embodiments, RF-transceiver 1517 may facilitate transmission and receiving of radio signals at antenna 1521. In some embodiments, power-amplifier 1519 and front-end-module 1515 may be used received radio signal filtration, detection, amplification, and/or demodulation before received radio signal inputs may be processed by baseband processor(s) 1503, for A-D conversion, as an example. Received radio signals may be processed from cellular, PCS, AWS, 5G, LPWAN, satellite (L) frequency bands. In some embodiments, envelope-tracking 1523 may be used by smartphone 100 (and/or by smartphone 800) to efficiently manage power supply to power-amplifier 1519, by adjusting voltage, which may in turn prolong battery 1535 usefulness. See e.g., FIG. 15 for Processor(s) 1501, baseband processor(s) 1503, front-end-module 1515, RF-transceiver 1517, power-amplifier 1519, antenna 1521, and envelop-tracking 1523.

Continuing discussing FIG. 15, in some embodiments, front-end-module 1525 may be in communication with Processor(s) 1501, baseband processor(s) 1503, and/or RF-transceiver 1527 (wherein the "RF" may be an abbreviation for "radio frequency"). In some embodiments, RF-transceiver 1527 may be in communication with power-amplifier 1529. In some embodiments, power-amplifier 1529 may be in communication with antenna 1531. In some embodiments, power-amplifier 1529 may be in communication with envelope-tracking 1523. In some embodiments, antenna 1531 may be for external radio frequency based communications. In some embodiments, antenna 1531 may be for receiving and transmitting radio frequency based communications. In some embodiments, antenna 1531 may be at least partially constructed from graphene. In some embodiments, antenna 1531 may be removably and/or extendedly housed within the antenna silo that has antenna-hole 443. In some embodiments, wherein antenna 1531 may be extendable, this may facilitate communications with satellites and/or satellite networks. In some embodiments, antenna 1531 may be for communications via one or more of: Link 1, Link 2, Link 3, Link 5, and/or Link 6, as such "Links" may be shown in FIG. 16. In some embodiments, RF-transceiver 1527 may be in communication with antenna 1531. In some embodiments, RF-transceiver 1527 may facilitate transmission and receiving of radio signals at antenna 1531. In some embodiments, power-amplifier 1529 and front-end-module 1525 may be used received radio signal filtration, detection, amplification, and/or demodulation before received radio signal inputs may be processed by baseband processor(s) 1503, for A-D conversion, as an example. Received radio signals may be processed from cellular, PCS, AWS, 5G, LPWAN, satellite (L) frequency bands. In some embodiments, envelope-tracking 1523 may be used by smartphone 100 (and/or by smartphone 800) to efficiently manage power supply to power-amplifier 1539, by adjusting voltage, which may in turn prolong battery 1535 usefulness. See e.g., FIG. 15 for Processor(s) 1501, baseband processor(s) 1503, front-end-module 1525, RF-transceiver 1527, power-amplifier 1529, antenna 1531, and envelop-tracking 1523.

Continuing discussing FIG. 15, in some embodiments, main-PMIC 1533 may be in communication with: Processor(s) 1501, envelope-tracking 1523, battery 1535, and/or charger 1537. In some embodiments, main-PMIC 1533 may be a power management integrated circuit. In some embodiments, main-PMIC 1533 may manage and/or control at least some power requirements of hardware-components 1500. Various apps running on application processor(s) 1505 (or online services) may desire to access and/or main-PMIC 1533. See e.g., FIG. 15.

Continuing discussing FIG. 15, in some embodiments, battery 1535 may be in communication with: charger 1537, solar-charging-system 1553, main-PMIC 1533, lighting-system 1551. In some embodiments, battery 1535 may be one or more batteries. In some embodiments, battery 1535 may be a rechargeable battery. In some embodiments, battery 1535 may be one or more rechargeable batteries. In some embodiments, battery 1535 may provide electrical power to hardware-components 1500 of smartphone 100 (and/or smartphone 800). See e.g., FIG. 15.

Continuing discussing FIG. 15, in some embodiments, charger 1537 may be in communication with: battery 1535, solar-charging-system 1553, main-PMIC 1533, lighting-system 1551. In some embodiments, charger 1537 may provide electrical power from an external source to battery 1535. In some embodiments, charger 1537 may receive electrical power from charging-port 749. In some embodiments, charger 1537 may receive electrical power from an electrically powered cable, cord, and/or wire(s) that may be removably coupled to charging-port 749. In some embodiments, charger 1537 may be charging-port 749. Various apps running on application processor(s) 1505 (or online services) may desire to access and/or charger 1537. See e.g., FIG. 15.

Continuing discussing FIG. 15, in some embodiments, NFC-reader 1539 may be in communication with: Processor(s) 1501 and/or application processor(s) 1505. In some embodiments, NFC-reader 1539 may be a near field communication reader. In some embodiments, NFC-reader 1539 may read NFC tags and/or RFID tags (radio frequency ID tags or radio frequency identification tags). In some embodiments, NFC-reader 1539 may be incorporated into wireless-radio 1541, antenna 1521, and/or antenna 1531. Various apps running on application processor(s) 1505 (or online services) may desire to access and/or NFC-reader 1539. See e.g., FIG. 15.

Figure 16:
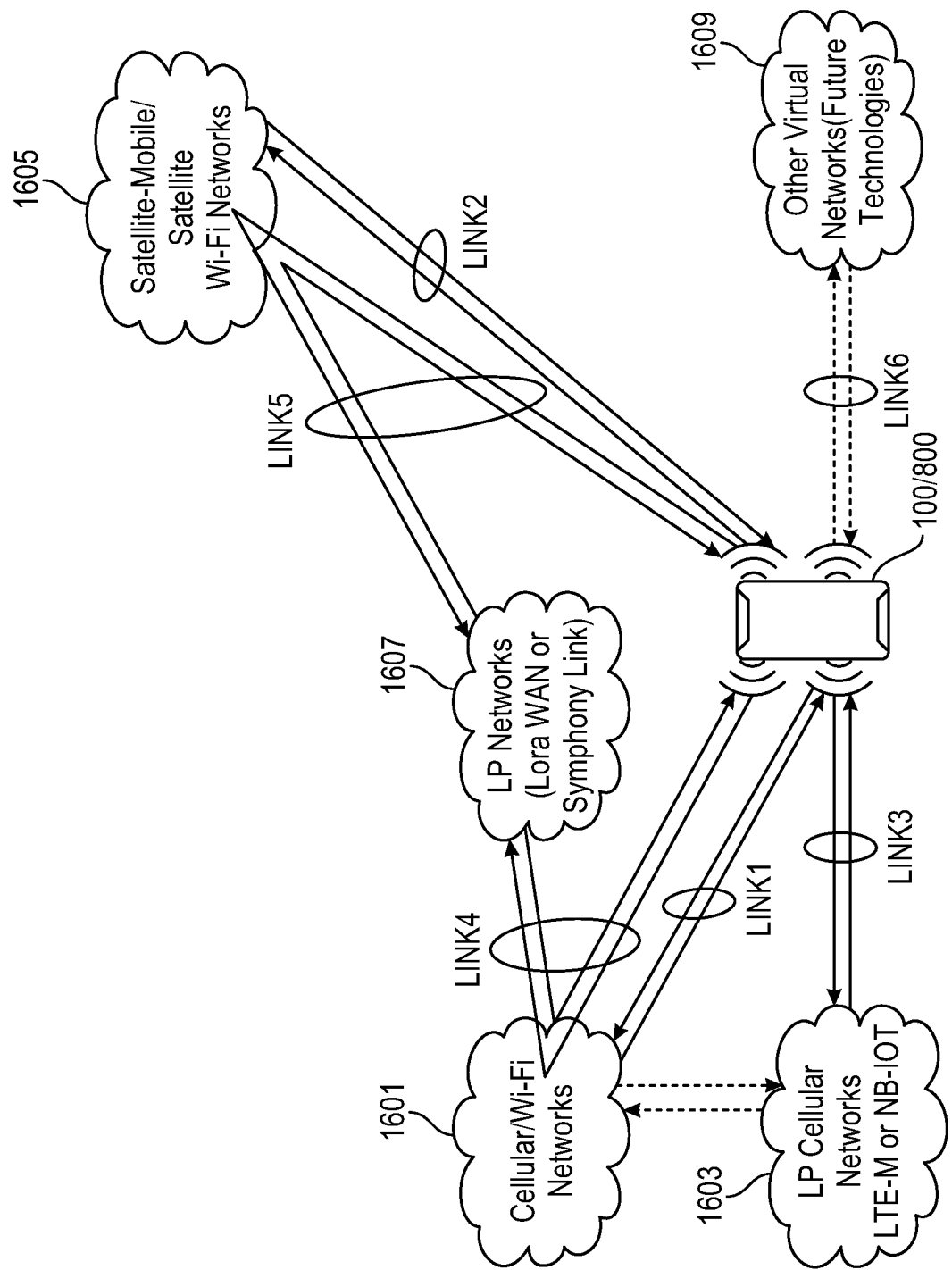

Continuing discussing FIG. 15, in some embodiments, wireless-radio 1541 may be in communication with: Processor(s) 1501 and/or application processor(s) 1505. In some embodiments, wireless-radio 1541 may be one or more radios for wireless communications. In some embodiments, wireless-radio 1541 may comprise its own antenna (or multiple antennas), power amplifier, and/or RF-transceiver. In some embodiments, wireless-radio 1541 may be configured for Wi-Fi communications. In some embodiments, wireless-radio 1541 may comprise a Bluetooth chipset for Bluetooth protocol wireless communications. In some embodiments, wireless-radio 1541 may be a Bluetooth chipset for Bluetooth protocol wireless communications. In some embodiments, wireless-radio 1541 may facilitate wireless communications along Link 1, Link 2, Link 3, Link 4, Link 5, and/or Link 6; wherein such "Links" are shown in FIG. 16. Various apps running on application processor(s) 1505 may desire to access and/or utilize wireless-radio 1541. See e.g., FIG. 15 for wireless-radio 1541.

Continuing discussing FIG. 15, in some embodiments, sensor(s) 1543 may be in communication with: Processor(s) 1501 and/or application processor(s) 1505. In some embodiments, sensor(s) 1543 may be one or more receiving various inputs. In some embodiments, sensor(s) 1543 may be selected from one or more of: MEMS sensor (e.g., gyroscope, accelerometer, pressure, and/or the like), fingerprint-scanner 335, temperature sensor, light-sensor 111, proximity-sensor 113, and/or the like. Various apps running on application processor(s) 1505 (or online services) may desire to access and/or utilize sensor(s) 1543. See e.g., FIG. 15.

Continuing discussing FIG. 15, in some embodiments, electronic-compass 1545 may be in communication with: Processor(s) 1501 and/or application processor(s) 1505. In some embodiments, electronic-compass 1545 may be for determining compass directions that smartphone 100 (and/or smartphone 800) may be oriented towards. Various apps running on application processor(s) 1505 (or online services) may desire to access and/or utilize electronic-compass 1545. See e.g., FIG. 15.

Continuing discussing FIG. 15, in some embodiments, GNSS 1547 may be in communication with: Processor(s) 1501 and/or application processor(s) 1505. In some embodiments, GNSS 1547 may be for determining a location and/or a position of smartphone 100 (and/or smartphone 800). In some embodiments, GNSS 1547 may comprise a GPS (global positioning system) chip set. In some embodiments, "GNSS" may stand for, "Global Navigation Satellite System." Various apps running on application processor(s) 1505 (or online services) may desire to access and/or utilize GNSS 1547. See e.g., FIG. 15.

Continuing discussing FIG. 15, in some embodiments, port 1549 may be in communication with: Processor(s) 1501 and/or application processor(s) 1505. In some embodiments, port 1549 may be a data port and/or electrical power receiving port. In some embodiments, port 1549 may be a USB port. In some embodiments, port 1549 may be a USB micro port. In some embodiments, port 1549 may be port of preexisting geometry and communication protocol. In some embodiments, port 1549 may be port of proprietary geometry and communication protocol. Various apps running on application processor(s) 1505 (or online services) may desire to access and/or utilize port 1549. See e.g., FIG. 15.

Continuing discussing FIG. 15, in some embodiments, lighting-system 1551 may be in communication with: Processor(s) 1501 and/or application processor(s) 1505. In some embodiments, lighting-system 1551 may be a lighting system used to communicate incoming calls, new text messages, new emails, and/or the like to a user of smartphone 100 (and/or smartphone 800). In some embodiments, lighting-system 1551 may be a lighting system used to communicate various notices, notifications, alerts, and/or the like to a user of smartphone 100 (and/or smartphone 800). In some embodiments, lighting-system 1551 may be known as "LED Lumminax System." In some embodiments, lighting-system 1551 may comprise one or more LEDs. In some embodiments, lighting-system 1551 may comprise one or more LED strips. In some embodiments, such LEDs may be of different colors and/or capable of being activated in different patterns. In some embodiments, lighting-system 1551 may be located substantially around an outside edge of touchscreen 101. In some embodiments, lighting-system 1551 may be located substantially around an outside perimeter of touchscreen 101. In some embodiments, lighting-system 1551 may be located substantially around an outside perimeter of smartphone 100 (and/or smartphone 800). In some embodiments, lighting-system 1551 may be located substantially around an upper inside edge of the bezel (bezel-side 119, bezel-corners 121, bezel-top 129, and/or bezel-bottom 745). In some embodiments, lighting-system 1551 may comprise one or more light-emitting-diode (LED) strips. In some embodiments, at least portions of the one or more light-emitting-diode strips may emit light in response to predetermined types of incoming communications received at one or more of the at least three different communication circuits. In some embodiments, instead of an entirety of the LED strip(s) lighting up at once, light may rather travel around the LED strip(s). Different colors of lighting up of the LED strip(s) and/or different lighting patterns may indicate different types of incoming calls, new text messages, new emails, notices, notifications, alerts, and/or the like. Different colors of lighting up of the LED strip(s) and/or different lighting patterns may indicate different and/or specific senders had originated the incoming communication. Different colors of lighting up of the LED strip(s) and/or different lighting patterns may indicate different times of the day. See e.g., FIG. 18B for possible locations of such LED strips. How the LED strip(s) behave per different inputs may be customized by the user in some embodiments. Various apps running on application processor(s) 1505 (or online services) may desire to access and/or utilize lighting-system 1551. See e.g., FIG. 15 for lighting-system 1551.

Continuing discussing FIG. 15, in some embodiments, solar-charging-system 1553 may be in communication with: Processor(s) 1501 and/or application processor(s) 1505, charger 1537, battery 1535, and/or main-PMIC 1533. In some embodiments, solar-charging-system 1553 may be for receiving solar power and converting such received solar power into electrical power. In some embodiments, solar-charging-system 1553 may one or more solar-panel(s) 341 (which may be affixed to or part of backside 333). Various apps running on application processor(s) 1505 (or online services) may desire to access and/or utilize solar-charging-system 1553. See e.g., FIG. 15.

Continuing discussing FIG. 15, in some embodiments, display-PMIC 1555 may be in communication with: Processor(s) 1501 and touchscreen 101. In some embodiments, display-PMIC 1555 may be for power management of touchscreen 101. Various apps running on application processor(s) 1505 (or online services) may desire to access and/or utilize display-PMIC 1555. See e.g., FIG. 15.

Continuing discussing FIG. 15, in some embodiments, camera-PMIC 1557 may be in communication with: Processor(s) 1501, camera 109, camera 339, and/or flashlighting 337. In some embodiments, camera-PMIC 1557 may be for power management of smartphone 100's cameras and/or flash lighting functions (and/or smartphone 800's cameras and/or flash lighting functions). Various apps running on application processor(s) 1505 (or online services) may desire to access and/or utilize camera-PMIC 1557. See e.g., FIG. 15.

Continuing discussing FIG. 15, in some embodiments, audio-codec 1559 may be in communication with: Processor(s) 1501, audio-amplifier 1561, audio-amplifier 1563, microphone 131, microphone 753, headphones 1565, speaker 117, and/or speaker 751. In some embodiments, audio-codec 1559 may facilitate compression and/or decompression of digital audio data. Various apps running on application processor(s) 1505 (or online services) may desire to access and/or utilize audio-codec 1559. See e.g., FIG. 15.

Continuing discussing FIG. 15, in some embodiments, audio-amplifier 1561 may be in communication with: audio-codec 1559, microphone 131, and/or microphone 753. In some embodiments, audio-amplifier 1561 may amplify digital audio data received at microphones of smartphone 100 (and/or smartphone 800). In some embodiments, the microphones of smartphone 100 (and/or smartphone 800) may be MEMs microphones. In some embodiments, at least some of the microphones of smartphone 100 (and/or smartphone 800) may be noise cancelling. Various apps running on application processor(s) 1505 (or online services) may desire to access and/or utilize audio-amplifier 1561. See e.g., FIG. 15.

Continuing discussing FIG. 15, in some embodiments, audio-amplifier 1563 may be in communication with: audio-codec 1559, headphones 1565, speaker 117, and/or speaker 751. In some embodiments, audio-amplifier 1563 may amplify digital audio data outputs of speakers of smartphone 100 (and/or smartphone 800). Various apps running on application processor(s) 1505 (or online services) may desire to access and/or utilize audio-amplifier 1563. See e.g., FIG. 15.

Continuing discussing FIG. 15, in some embodiments, touchscreen 101 may be in communication with display-PMIC 1555. In some embodiments, touchscreen 101 may for displaying content on smartphone 100 (and/or smartphone 800). In some embodiments, touchscreen 101 may for receiving various inputs to smartphone 100 (and/or smartphone 800). Various apps running on application processor(s) 1505 (or online services) may desire to access and/or utilize touchscreen 101. See e.g., FIG. 15.

Continuing discussing FIG. 15, in some embodiments, camera 109, camera 339, and/or flash-lighting 337 may be in communication with camera-PMIC 1557. In some embodiments, camera 109 may be a front facing camera. In some embodiments, camera 339 may be a rear facing camera. In some embodiments, camera 339 may be a dual camera. In some embodiments, flash-lighting 337 may be one or more LEDs that may provide various lighting functionality. In some embodiments, that lighting may be for camera 339. Various apps running on application processor(s) 1505 (or online services) may desire to access and/or utilize camera 109, camera 339, and/or flash-lighting 337. See e.g., FIG. 15.

Continuing discussing FIG. 15, in some embodiments, microphones 131 and/or microphone 753 may be in communication with audio-amplifier 1561. In some embodiments, microphones 131 and/or microphone 753 may for receiving audio external to smartphone 100 (and/or smartphone 800). In some embodiments, the microphones of smartphone 100 (and/or smartphone 800) may be MEMs microphones. In some embodiments, at least some of the microphones of smartphone 100 (and/or smartphone 800) may be noise cancelling. Various apps running on application processor(s) 1505 (or online services) may desire to access and/or utilize microphones 131 and/or microphone 753. See e.g., FIG. 15.

Continuing discussing FIG. 15, in some embodiments, headphones 1565, speaker 117, and/or speaker 751 may be in communication with audio-amplifier 1563. In some embodiments, headphones 1565, speaker 117, and/or speaker 751 may be for outputting audio. Various apps running on application processor(s) 1505 (or online services) may desire to access and/or utilize headphones 1565, speaker 117, and/or speaker 751. See e.g., FIG. 15.

FIG. 16. may depict a block diagram showing various communication pathways and various different network types that smartphone 100 (and/or smartphone 800) may wirelessly connect to. FIG. 16 may depict five different network types as follows: cellular/Wi-Fi network 1601; LP cellular network 1603; satellite network 1605; LP network 1607; and other network 1609. As denoted, cellular/Wi-Fi network 1601 may be a typical cellular network and/or a typical Wi-Fi network, either one of which may be in communication with the internet. In some embodiments, LP cellular network 1603 may be a: LTE-M, NB-IOT, and/or the like network. In some embodiments, satellite network 1605 may be a wireless communication network with direct communications to or from at least one satellite in Earth orbit. In some embodiments, satellite network 1605 may be satellite to mobile-computing-device (e.g., satellite phone) network. In some embodiments, satellite network 1605 may be satellite to Wi-Fi network. In some embodiments, LP network 1607 may be a LoraWAN network, Symphony Link network, and/or the like. In some embodiments, other network 1609 may be a virtual network or a future network.

Continuing discussing FIG. 16, in some embodiments, smartphone 100 (and/or smartphone 800) may communicate and/or utilize one or more of: cellular/Wi-Fi network 1601; LP cellular network 1603; satellite network 1605; LP network 1607; and other network 1609.

Continuing discussing FIG. 16, in some embodiments, Link 1 may be communications between smartphone 100 (and/or smartphone 800) and cellular/Wi-Fi network 1601. In some embodiments, Link 1 may be a direct communication link between the given smartphone (e.g., 100 and/or 800) and Cellular/Wi-Fi Network(s) 1601 when this given smartphone makes or receives a call and has that call. Wireless communication signals may be received and/or transmitted via one of the two antennas (e.g., 1521 or 1523), with signal manipulation occurring at one of the two power-amplifiers (e.g., 1519 or 1529, respectively), one of the two RF-transceivers (e.g., 1517 or 1527, respectively), one of the two front-end-modules (e.g., 1515 or 1525, respectively), and with signal processing at baseband processor(s) 1503.

Continuing discussing FIG. 16, in some embodiments, Link 3 may be communications between smartphone 100 (and/or smartphone 800) and LP cellular network 1603. In some embodiments, Link 3 may be a direct communication link between this smartphone (e.g., 100 and/or 800) and LP cellular network(s) 1603 (e.g., LTE-M, NB-IOT, and/or the like), when this smartphone (e.g., 100 and/or 800) connects to LP Cellular Network(s) 1603 for data transmission. For example, and without limiting the scope of the present invention, such data transmission may be for the customer's smart devices' data. Such data transmission may be facilitated by the customer's own apps (e.g., third party apps) or via customized and/or proprietary in-built apps. LP cellular network(s) 1603 may already be part of certain conventional cellular network service providers. However, not all conventional cellular operators provide LTE-M or NB-IOT service. To gain access to LP cellular network(s) 1603 one may need to be an account holder for that LP cellular network(s) 1603. LTE-M may handle Cat-M1 type smart sensor devices and may work with certain modules that the customer has to buy to be able to connect to such specific cellular LP cellular network(s) 1603. In these types of LP cellular network(s) 1603 one may not have to connect to an external gateway to be able to fetch data, as one can access the data directly with LP cellular network(s) 1603.

Continuing discussing FIG. 16, in some embodiments, Link 2 may be communications between smartphone 100 (and/or smartphone 800) and satellite network 1605. In some embodiments, Link 2 may be a direct communication link between the given smartphone (e.g., 100 and/or 800) and a given satellite-mobile or satellite-Wi-Fi networks (i.e., satellite network 1605) when this given smartphone (e.g., 100 and/or 800) makes or receives a call and has that call. In some embodiments, satellite network 1605 may comprise one or more communication satellites in Earth orbit. Wireless communication signals may be received and/or transmitted via one of the two antennas (e.g., 1521 or 1523), with signal manipulation occurring at one of the two power-amplifiers (e.g., 1519 or 1529, respectively), one of the two RF-transceivers (e.g., 1517 or 1527, respectively), one of the two front-end-modules (e.g., 1515 or 1525, respectively), and with signal processing at baseband processor(s) 1503. In some embodiments, one of the two antennas (e.g., 1521 or 1523) may be dedicated for satellite communications. In some embodiments, this dedicated antenna (e.g., 1521 or 1523) for satellite communications may be in removable communication with one or more communication satellites in Earth orbit.

Continuing discussing FIG. 16, in some embodiments, Link 4 may be communications between smartphone 100 (and/or smartphone 800) and LP network 1607, with using cellular/Wi-Fi network 1601 as an intermediary. In some embodiments, Link 4 may be an indirect communication link between the smartphone (e.g., 100 and/or 800) and LP Networks 1607 (such as LoraWAN, Symphony Link, and/or the like) via a conventional Cellular/Wi-Fi network, such as Cellular/Wi-Fi network 1601. When this smartphone (e.g., 100 and/or 800) may be connected to a cellular network and has an internet connection, the customer can connect to an external gateway to access smart devices' data. This could be a cloud based service provider, third party servers, or customer's own servers. All of this data can be accessed via customer's own apps (e.g., third party apps) or via customized and/or proprietary apps associated with smartphone 100 (and/or smartphone 800). The customer may need to buy specific modules and/or smart sensor devices that work with those virtual networks to be able to receive data at the gateway.

Continuing discussing FIG. 16, in some embodiments, Link 5 may be communications between smartphone 100 (and/or smartphone 800) and LP network 1607, with using satellite network 1605 as an intermediary. In some embodiments, Link 5 may be an indirect communication link between the smartphone (e.g., 100 and/or 800) and LP Networks 1607 (such as LoraWAN, Symphony Link, and/or the like) via a conventional Satellite-Wi-Fi or Satellite-mobile network i.e., satellite network 1605. When this smartphone (e.g., 100 and/or 800) may be connected to satellite network 1605 and has an internet connection, the customer can connect to an external gateway to access the smart devices' data. This could be a cloud based service provider, third party servers, or an customer's own server(s). All of this data can be accessed via customer's own apps (e.g., third party apps) or via customized and/or proprietary apps associated with smartphone 100 (and/or smartphone 800). The customer may need to buy specific modules and/or smart sensor devices that may work with such virtual networks to be able to receive data at the gateway.

Continuing discussing FIG. 16, in some embodiments, Link 6 may be communications between smartphone 100 (and/or smartphone 800) and other machine-machine (M2M) networks 1609.

Figure 17A:
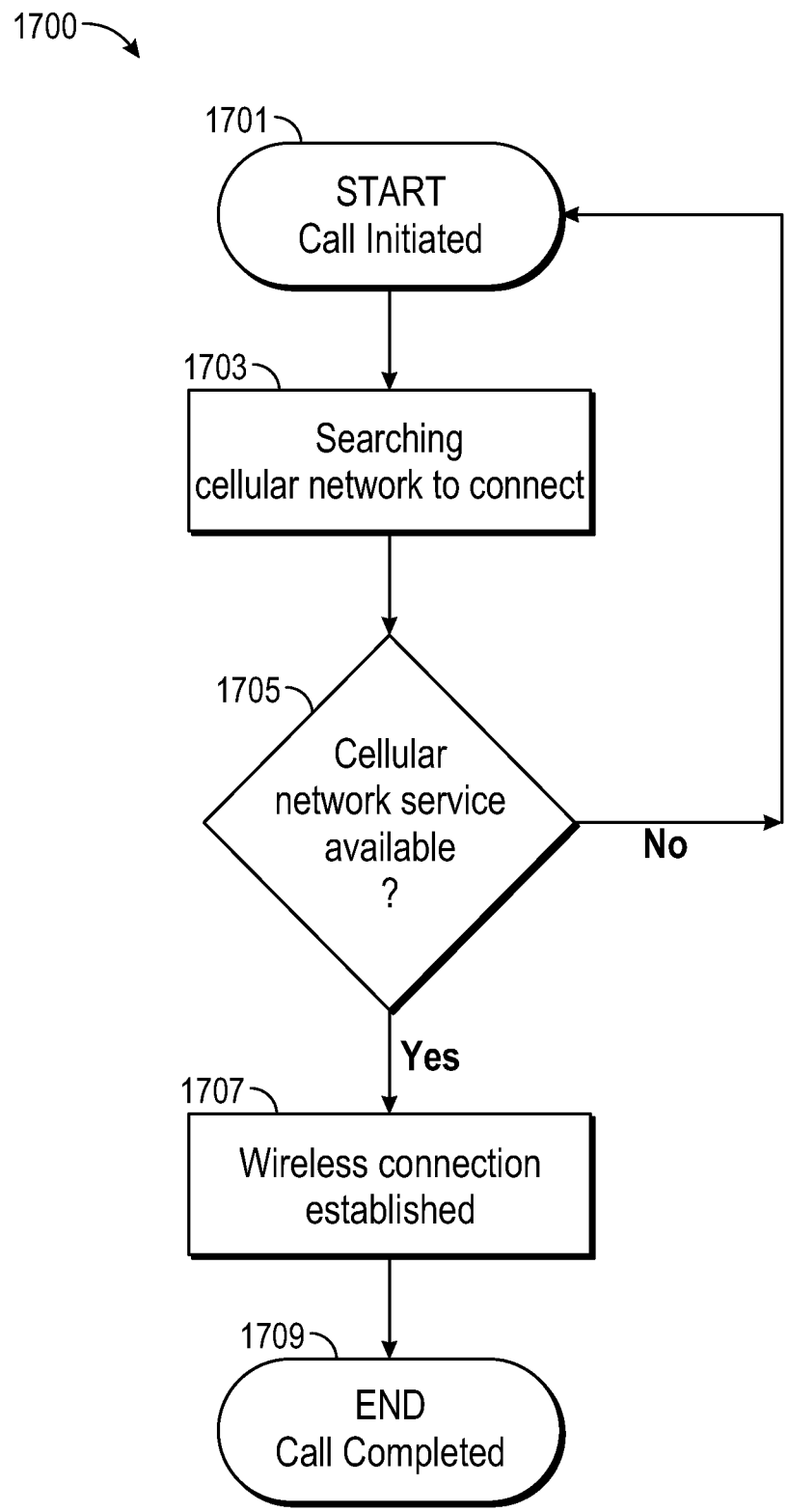
FIG. 17A may depict steps on a method of placing a typical phone call, from a smartphone, through a cellular network.

FIG. 17A may depict steps in a method 1700 of placing a typical phone call, from a smartphone (e.g., smartphone 100 and/or smartphone 800), through a cellular network (e.g., cellular/Wi-Fi network 1601). In some embodiments, method 1700 may comprise steps: 1701, 1703, 1705, 1707, and 1709. In some embodiments, step 1701 may be a step of a call being initiated (or of a call to be attempted) from smartphone 100 (and/or smartphone 800). In some embodiments, step 1701 may progress into step 1703. In some embodiments, step 1703 may be a step of smartphone 100 (and/or smartphone 800) searching for a cellular network to connect to. In some embodiments, step 1703 may progress into step 1705. In some embodiments, step 1705 may be a step of checking if a cellular network is available to connect to. If there is no cellular network to connect to or such a connection fails, then step 1705 may progress back to step 1701. Whereas, if a cellular network is available, then step 1705 may progress into step 1707. In some embodiments, step 1707 may be a step of having the cellular (or wireless) communication link established (e.g., Link 1 in FIG. 16). In some embodiments, step 1707 may then progress into step 1709. In some embodiments, step 1709 may a be step of completing or terminating that given call session. See e.g., FIG. 17A.

Figure 17B:
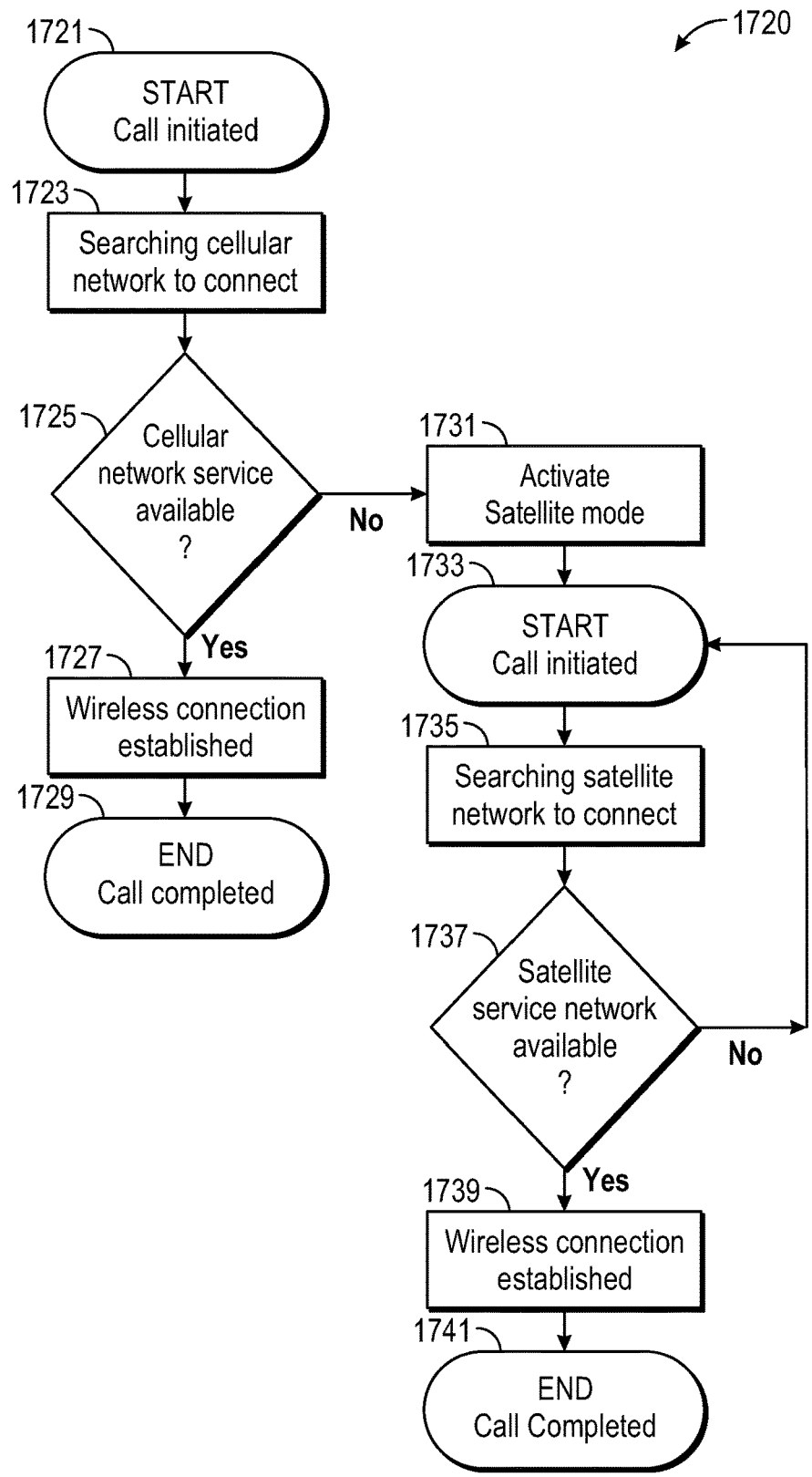
FIG. 17B may depict steps in of placing a phone call, from a smartphone, through either a cellular network or a satellite network.

FIG. 17B may depict steps in a method 1720 of placing a phone call, from smartphone 100 (and/or smartphone 800), through either a cellular network (e.g., cellular/Wi-Fi network 1601) or a satellite network (e.g., satellite network 1605). In some embodiments, method 1720 may comprise the following steps: 1721, 1723, 1725, 1727, 1729, 1731, 1733, 1735, 1737, 1739, and 1741.

Continuing discussing FIG. 17B, in some embodiments, step 1721 may be a step of a call being initiated (or of a call to be attempted) from smartphone 100 (and/or smartphone 800). In some embodiments, step 1721 may progress into step 1723. In some embodiments, step 1723 may be a step of smartphone 100 (and/or smartphone 800) searching for a cellular network to connect to. In some embodiments, step 1723 may progress into step 1725. In some embodiments, step 1725 may be a step of checking if a cellular network is available to connect to. In some embodiments, if a cellular network is available, then step 1725 may progress into step 1727. In some embodiments, step 1727 may be a step of having the cellular (or wireless) communication link established (e.g., Link 1 in FIG. 16). In some embodiments, step 1727 may then progress into step 1729. In some embodiments, step 1729 may a be step of completing or terminating that given call session. See e.g., FIG. 17B.

Continuing discussing FIG. 17B, in some embodiments, if there is no cellular network to connect to or such a connection fails, then step 1725 may progress to step 1731. In some embodiments, step 1731 may be a step activating satellite mode in smartphone 100 (and/or smartphone 800). In some embodiments, step 1731 may prompt the user to extend (deploy) the satellite antenna (e.g., antenna 1521 or antenna 1531) from antenna-hole 443. In some embodiments, antenna 1521 or antenna 1531 (but not both such antennas) may be a dedicated antenna for satellite communications along Link 2 and/or along Link 5 from FIG. 16.

Continuing discussing FIG. 17B, in some embodiments, step 1731 may progress into step 1733. In some embodiments, step 1733 may be a step a satellite call being initiated (or of a satellite call to be attempted) from smartphone 100 (and/or smartphone 800). In some embodiments, step 1733 may progress into step 1735. In some embodiments, step 1735 may be a step of smartphone 100 (and/or smartphone 800) searching for a satellite network to connect to (e.g., satellite network 1605). In some embodiments, step 1735 may progress into step 1737. In some embodiments, step 1737 may be a step of checking if a satellite network is available to connect to. If there is no satellite network to connect to or such a connection fails, then step 1737 may progress back to step 1733. Whereas, if a satellite network is available, then step 1737 may progress into step 1739. In some embodiments, step 1739 may be a step of having the satellite communication link established (e.g., Link 2 or Link 5 in FIG. 16). In some embodiments, step 1739 may then progress into step 1741. In some embodiments, step 1741 may a be step of completing or terminating that given satellite call session. See e.g., FIG. 17B.

Figure 17C:
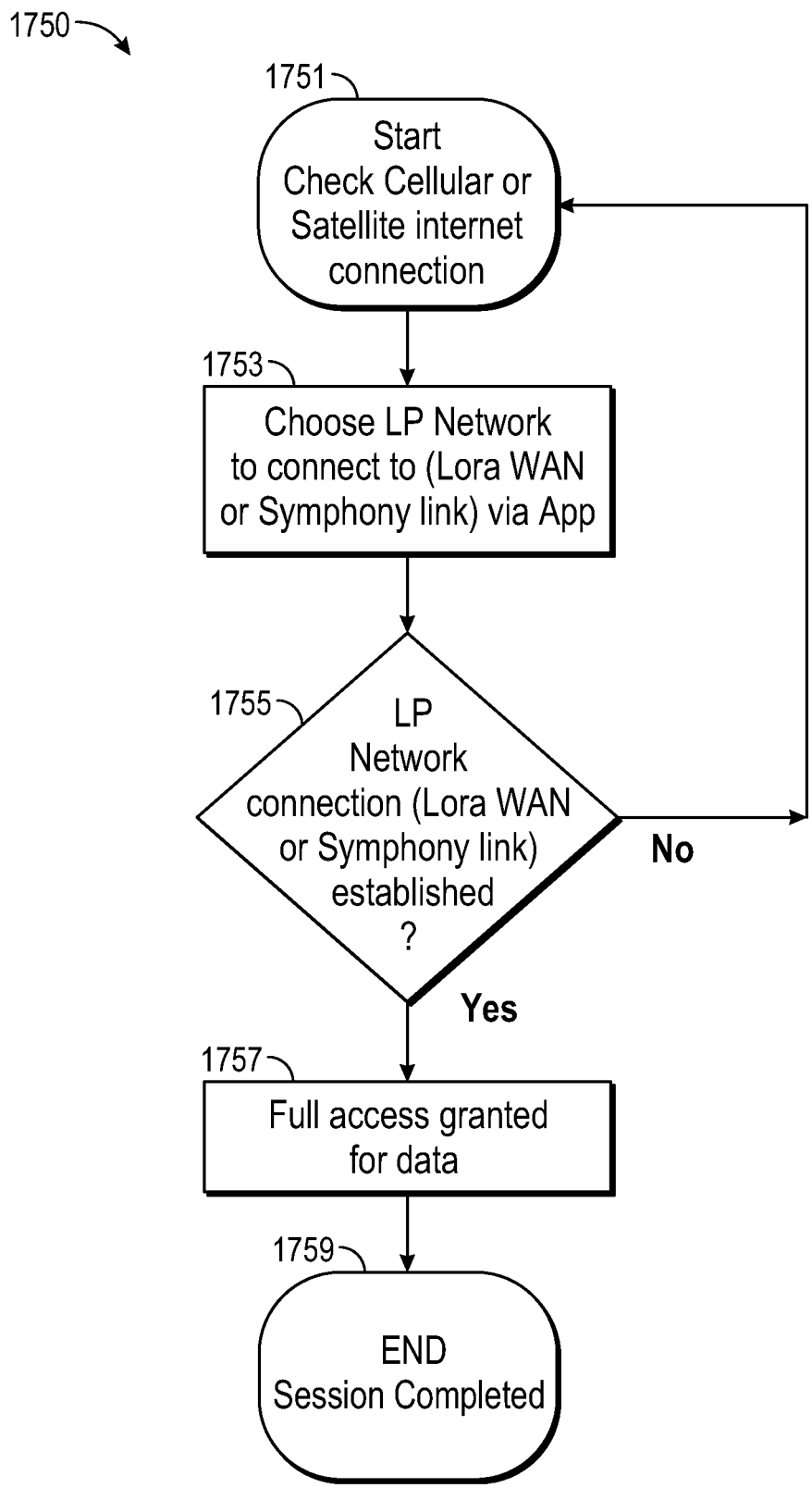
FIG. 17C may depict steps of a smartphone connecting to a LP Network (such as, but not limited to, LoraWAN or Symphony Link) for data transmission.

FIG. 17C may depict steps in a method 1750 of smartphone 100 (and/or smartphone 800) connecting to a LP Network 1607 (such as, but not limited to, LoraWAN or Symphony Link) for data transmission. In some embodiments, method 1750 may comprise the following steps: 1751, 1753, 1755, 1757, and 1759. In some embodiments, step 1751 may be a step of checking if a cellular data or a satellite data network and/or connection may be available. For example, and without limiting the scope of the present invention, a cellular data connection may progress via Link 4 to cellular/Wi-Fi network 1601. For example, and without limiting the scope of the present invention, a satellite data connection may progress via Link 5 to satellite network 1605. In some embodiments, step 1751 may progress into step 1753. In some embodiments, step 1753 may be a step of receiving a choice of LP network (e.g., LoraWAN or Symphony Link or other LP network) to connect to. In some embodiments, step 1753 may then progress into step 1755. In some embodiments, step 1755 may be a step checking if the connection to the selected LP network has been established. If such a connection was not established or failed, then step 1755 may progress back to step 1751. Whereas, if such a connection was established, then step 1755 may progress to step 1757. In some embodiments, step 1757 may be a step of receiving access permission for data transmissions (which may include sending and/or receiving data) via the LP network connected to; wherein such data transmission (which may include sending and/or receiving data) may then follow. In some embodiments, step 1757 may then progress to step 1759. In some embodiments, step 1759 may a be step of completing or terminating that given data transmission session (which may include sending and/or receiving data). See e.g., FIG. 17C.

Figure 18A:
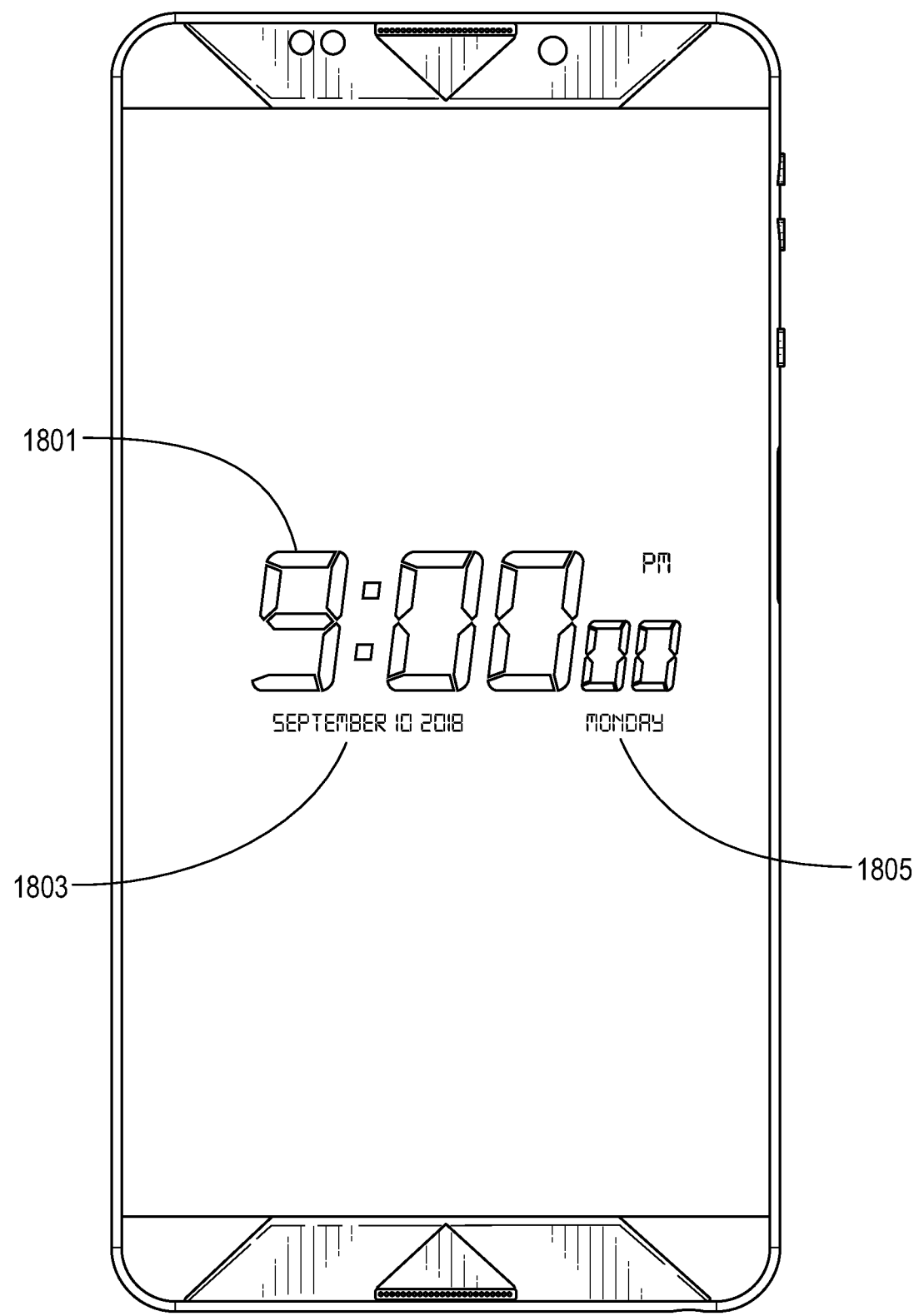
FIG. 18A may depict a front view of a smartphone displaying a default lock screen.

FIG. 18A may depict a front view of a smartphone displaying a default lock screen. In some embodiments, when touchscreen 101 may be locked but receiving user input (e.g., engagement of home-screen-button 105), touchscreen 101 may display content as shown in FIG. 18A. In some embodiments, a locked but activated touchscreen 101 may display time 1801, date 1803, and/or day 1805 of the week. In some embodiments, the time 1801, date 1803, and/or day 1805 may be displayed in a "digital clock" font format as shown in FIG. 18A.

Figure 18B:
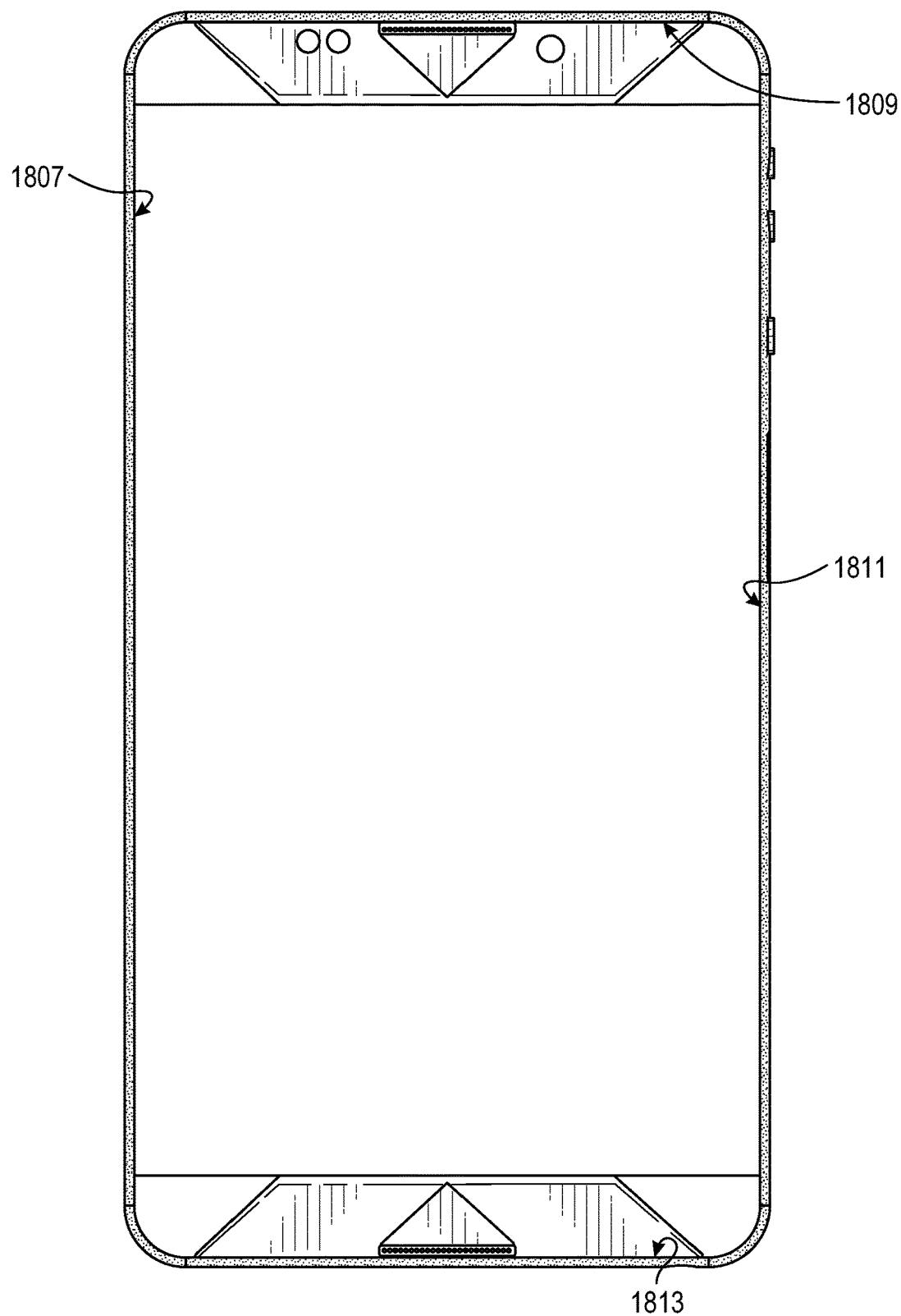
FIG. 18B may depict a front view of a smartphone displaying a lighting system for signaling to a user of the smartphone of an incoming call or other notification.

FIG. 18B may depict a front view of smartphone 100 (and/or smartphone 800) displaying lighting-system 1551. In some embodiments, lighting-system 1551 may be a lighting system used to communicate incoming call notifications, new text messages, new voicemails, new emails, and/or the like to a user of smartphone 100 (and/or smartphone 800). In some embodiments, lighting-system 1551 may be a lighting system used to communicate various notices, notifications, alerts, and/or the like to a user of smartphone 100 (and/or smartphone 800). In some embodiments, lighting-system 1551 may be known as LED "Lumminax System." In some embodiments, lighting-system 1551 may comprise one or more LEDs (lights 1807, 1809, 1811, and/or 1813). In some embodiments, lighting-system 1551 may comprise one or more LED strips (light strips 1807, 1809, 1811, and/or 1813). In some embodiments, such LEDs may be of different colors and/or capable of being activated in different patterns. In some embodiments, lighting-system 1551 may be located substantially around an outside edge of touchscreen 101. In some embodiments, lighting-system 1551 may be located substantially around an outside perimeter of touchscreen 101. In some embodiments, lighting-system 1551 may be located substantially around an outside perimeter of smartphone 100 (and/or smartphone 800). In some embodiments, lighting-system 1551 may be located substantially around an upper inside edge of the bezel (bezel-side 119, bezel-corners 121, bezel-top 129, and/or bezel-bottom 745). In some embodiments, instead of an entirety of the LED strip(s) lighting up at once, light may rather travel around the LED strip(s). Different colors of lighting up of the LED strip(s) and/or different lighting patterns may indicate different types of incoming calls, new text messages, new emails, notices, notifications, alerts, and/or the like. Different colors of lighting up of the LED strip(s) and/or different lighting patterns may indicate different and/or specific senders had originated the incoming communication. Different colors of lighting up of the LED strip(s) and/or different lighting patterns may indicate different times of the day. See e.g., FIG. 18B for possible locations of such LED strips. How the LED strip(s) behave per different inputs may be customized by the user in some embodiments.

Continuing discussing FIG. 18B, in some embodiments, light 1807 may be a LED strip along an inside upper edge of bezel-side 119. In some embodiments, light 1809 may be a LED strip along an inside upper edge of bezel-top 129. In some embodiments, light 1811 may be a LED strip along an inside upper edge of bezel-side 119. In some embodiments, light 1813 may be a LED strip along an inside upper edge of bezel-bottom 745.

Figure 18C:
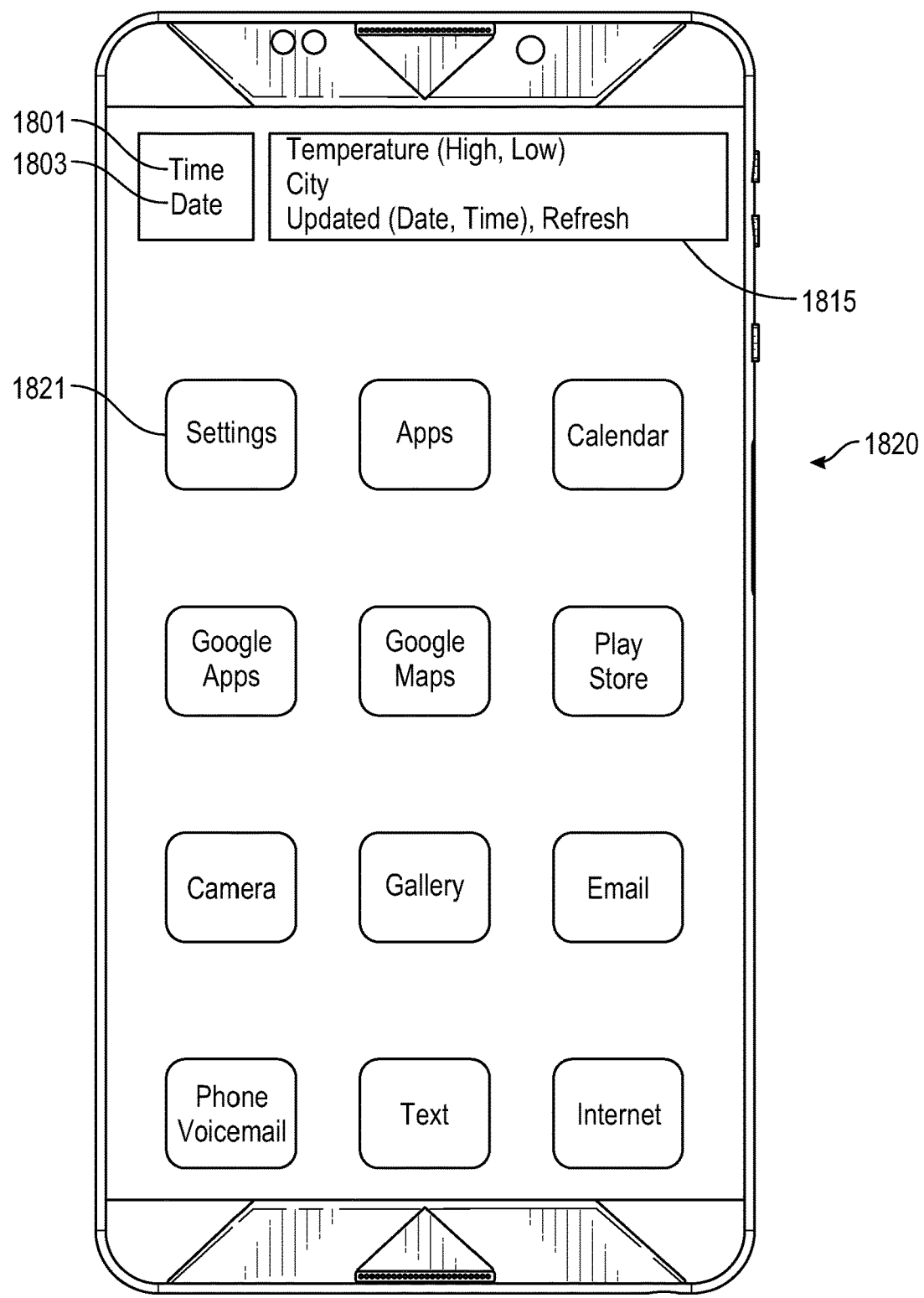
FIG. 18C may depict a front view of a smartphone displaying a default home page screen.

FIG. 18C may depict a front view of smartphone 100 (and/or smartphone 800) displaying a default home page screen. In some embodiments, a home page screen may display: time 1801, date 1803, geographic-relevant-info 1815, and various virtual-buttons 1821. In some embodiments, home-screen 1820 may denote the time 1801, date 1803, geographic-relevant-info 1815, and various virtual-buttons 1821 as shown in FIG. 18C. In some embodiments, home-screen 1820 may denote the layout of time 1801, date 1803, geographic-relevant-info 1815, and various virtual-buttons 1821 as shown in FIG. 18C. In some embodiments, geographic-relevant-info 1815 may display information relevant a location/position of the given smartphone 100 (and/or smartphone 800). In some embodiments, geographic-relevant-info 1815 may display temperature (current, high, and/or low), city, and updated (date, time), and refresh. In some embodiments, virtual-buttons 1821 may be virtual buttons displayed on touchscreen 101 for triggering: Settings, Apps, Calendar, Google Apps, Google Maps, Play Store, Camera, Gallery, Email, Phone Voicemail, Text, and/or Internet.

In some embodiments, touchscreen 101 may display home screen 1820, wherein the home screen 1820 may display a plurality of virtual buttons 1821 for launching predetermined functions; wherein the plurality of virtual buttons 1821 may be arranged into four rows and three columns; wherein in a first row, starting at in an upper left direction and moving towards the right may be a "Settings" virtual button, followed by an "Apps" virtual button, followed by a "Calendar" virtual button; wherein in a second row, below the first row, and moving towards the right may be a "Google Apps" virtual button, followed by a "Google Maps" virtual button, followed by a "Play Store" virtual button; wherein in a third row, below the second row, and moving towards the right may be a "Camera" virtual button, followed by a "Gallery" virtual button, followed by an "Email" virtual button; wherein in a fourth and final row, below the third row, moving towards the right may be a "Phone Voicemail" virtual button, followed by a "Text" virtual button, and followed by an "Internet" virtual button. See e.g., FIG. 18C.

Figure 18D:
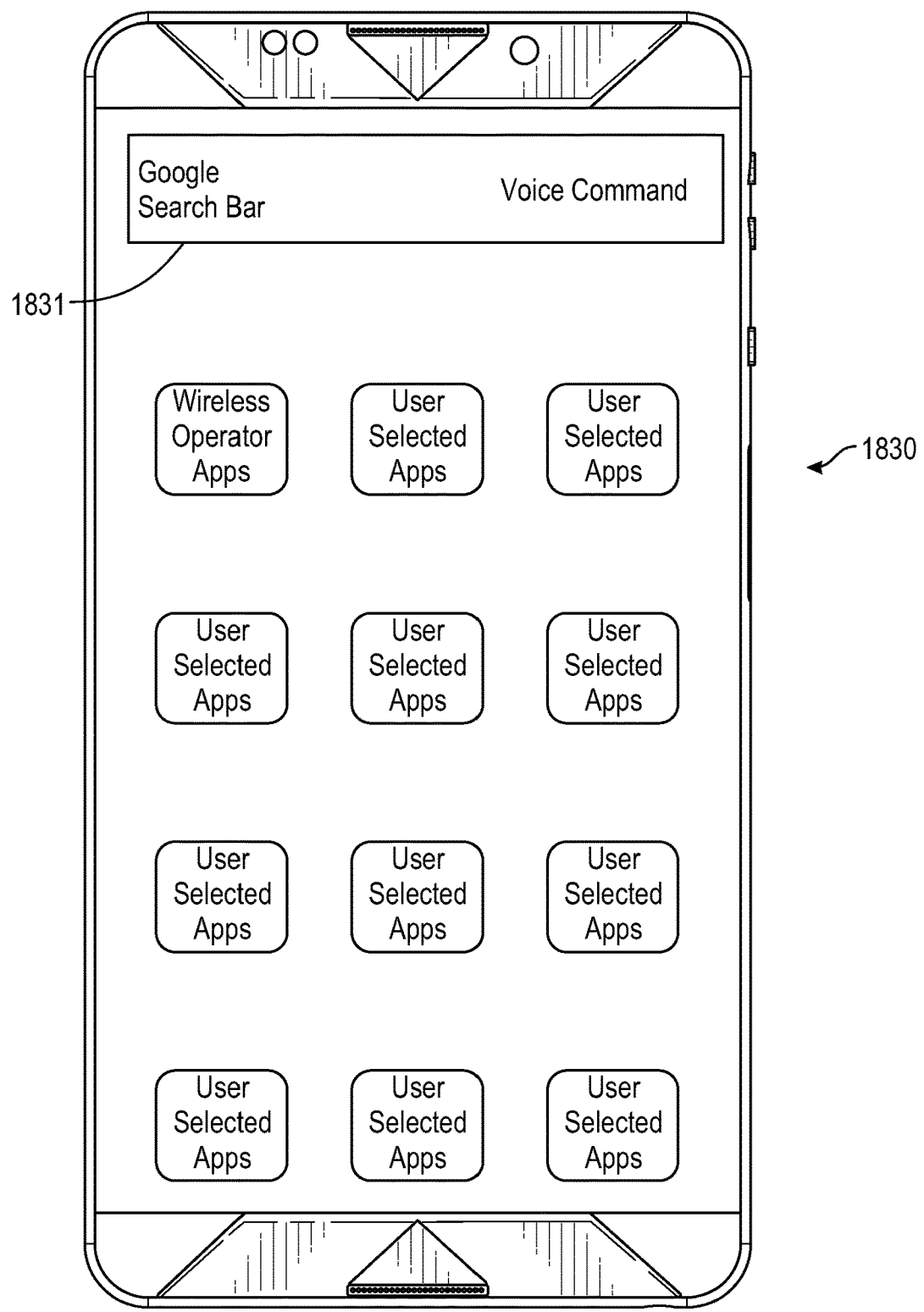
FIG. 18D may depict a front view of a smartphone displaying a default "apps" screen, which may be accessible from a home page screen.

FIG. 18D may depict a front view of a smartphone displaying a default "apps" screen, which may be accessible from a home page screen displayed on touchscreen 101. In some embodiments, apps-list-display 1830 may display a first page of apps (programs). In some embodiments, apps-list-display 1830 may display various virtual buttons for launching various apps (applications/programs). The apps displayed from apps-list-display 1830 may comprise wireless operator apps and user selected apps. At a top of touchscreen 101 in FIG. 18D may also be displayed command-prompt 1831. In some embodiments, command-prompt 1831 may provide a field for entering search queries. In some embodiments, command-prompt 1831 may status of various voice activated commands.

Figure 18E:
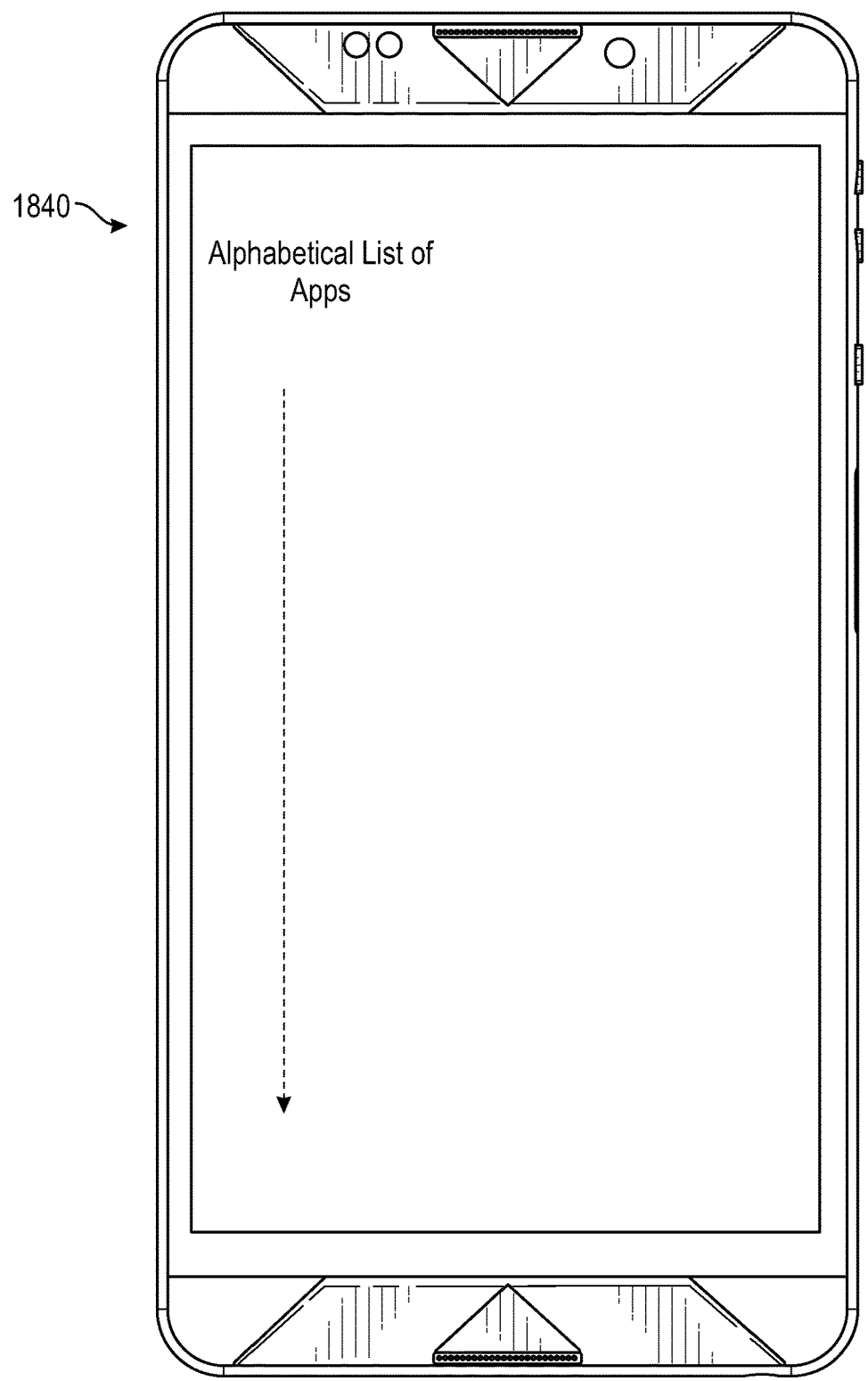
FIG. 18E may depict a front view of a smartphone displaying an "apps" screen.

FIG. 18E may depict a front view of smartphone 100 (and/or smartphone 800) displaying an "apps" screen. In some embodiments, apps-list-display 1840 may display apps (programs) an alphabetical list order.

Figure 18F:
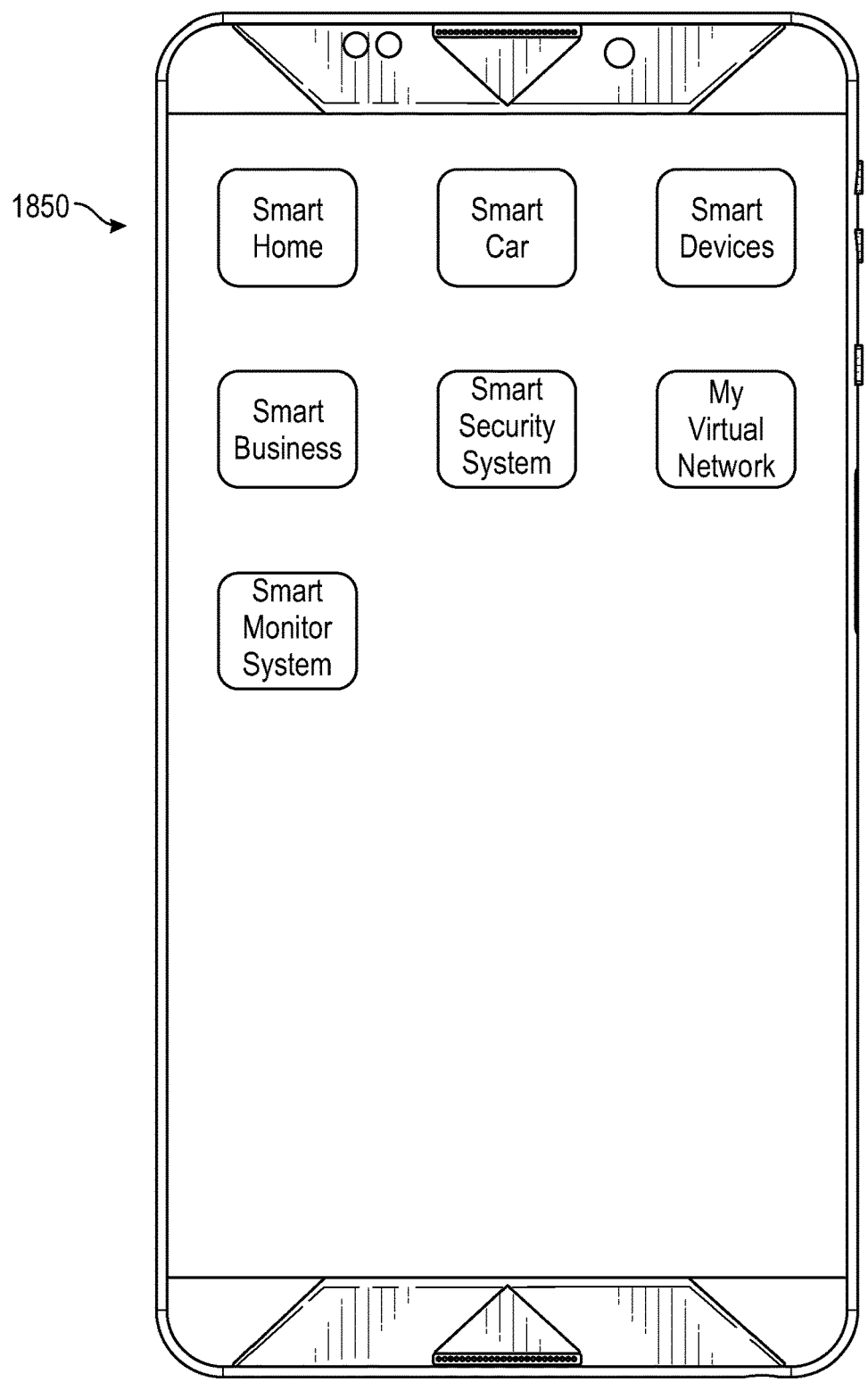
FIG. 18F may depict a front view of a smartphone displaying of "smart apps" screen.

FIG. 18F may depict a front view of smartphone 100 (and/or smartphone 800) displaying of "smart apps" screen. In some embodiments, apps-display 1850 may display various "special" apps. These special apps may be apps provided by a supplier of smartphone 100 (and/or smartphone 800). These special apps may be apps provided by a wireless operator (e.g., internet service provider) and/or by third parties under agreement (e.g., license) with the supplier of smartphone 100 (and/or smartphone 800) and/or the wireless operator. These special apps may be various "smart apps," such as, but not limited to: Smart Home, Smart Car, Smart Devices, Smart Business, Smart Security System, My Virtual Network, and/or Smart Monitor System. These special apps may be various "smart apps" for managing and/or controlling internet-of-things devices accessible by the user.

Figure 19A:
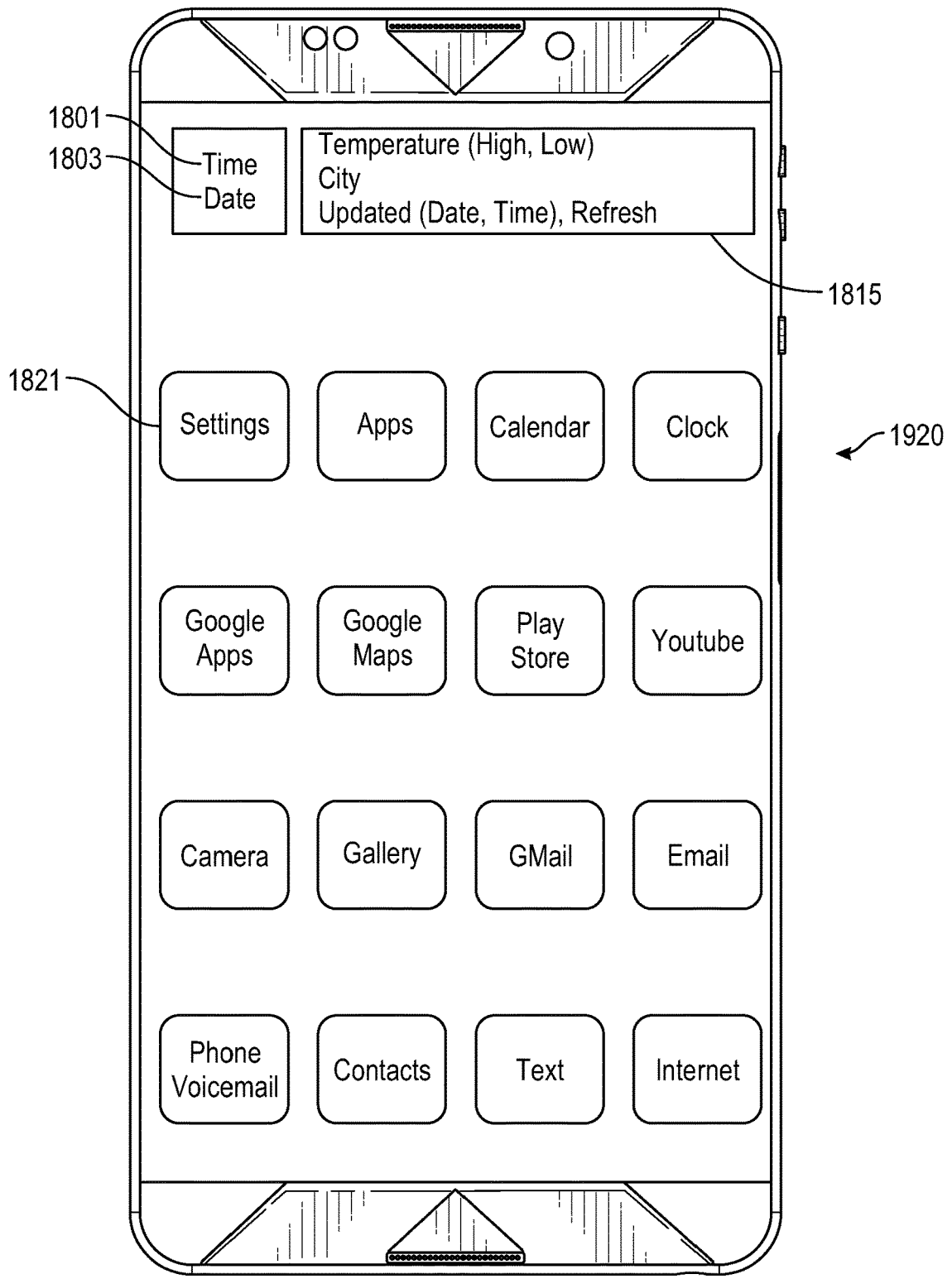
FIG. 19A may depict a front view of a smartphone displaying a default home page screen.

FIG. 19A may depict a front view of smartphone 100 (and/or smartphone 800) displaying a default home page screen. In some embodiments, a home page screen may display: time 1801, date 1803, geographic-relevant-info 1815, and various virtual-buttons 1821. In some embodiments, home-screen 1920 may denote the time 1801, date 1803, geographic-relevant-info 1815, and various virtual-buttons 1821 as shown in FIG. 19A. In some embodiments, home-screen 1920 may denote the layout of time 1801, date 1803, geographic-relevant-info 1815, and various virtual-buttons 1821 as shown in FIG. 19A. In some embodiments, virtual-buttons 1821 may be virtual buttons displayed on touchscreen 101 for triggering: Settings, Apps, Calendar, Clock, Google Apps, Google Maps, Play Store, YouTube, Camera, Gallery, Gmail, Email, Phone Voicemail, Contacts, Text, and/or Internet.

In some embodiments, touchscreen 101 may display a home screen 1920, wherein the home screen 1920 may display a plurality of virtual buttons 1821 for launching predetermined functions; wherein the plurality of virtual buttons 1821 may be arranged into four rows and four columns; wherein in a first row, starting at in an upper left direction and moving towards the right may be a "Settings" virtual button, followed by an "Apps" virtual button, followed by a "Calendar" virtual button, followed by a "Clock" virtual button; wherein in a second row, below the first row, and moving towards the right may be a "Google Apps" virtual button, followed by a "Google Maps" virtual button, followed by a "Play Store" virtual button, followed by a "Youtube" virtual button; wherein in a third row, below the second row, and moving towards the right may be a "Camera" virtual button, followed by a "Gallery" virtual button, followed by a "Gmail" virtual button, followed by an "Email" virtual button; wherein in a fourth and final row, below the third row, moving towards the right may be a "Phone Voicemail" virtual button, followed by a "Contacts" virtual button, followed by a "Text" virtual button, and followed by an "Internet" virtual button. See e.g., FIG. 19A.

Figure 19B:
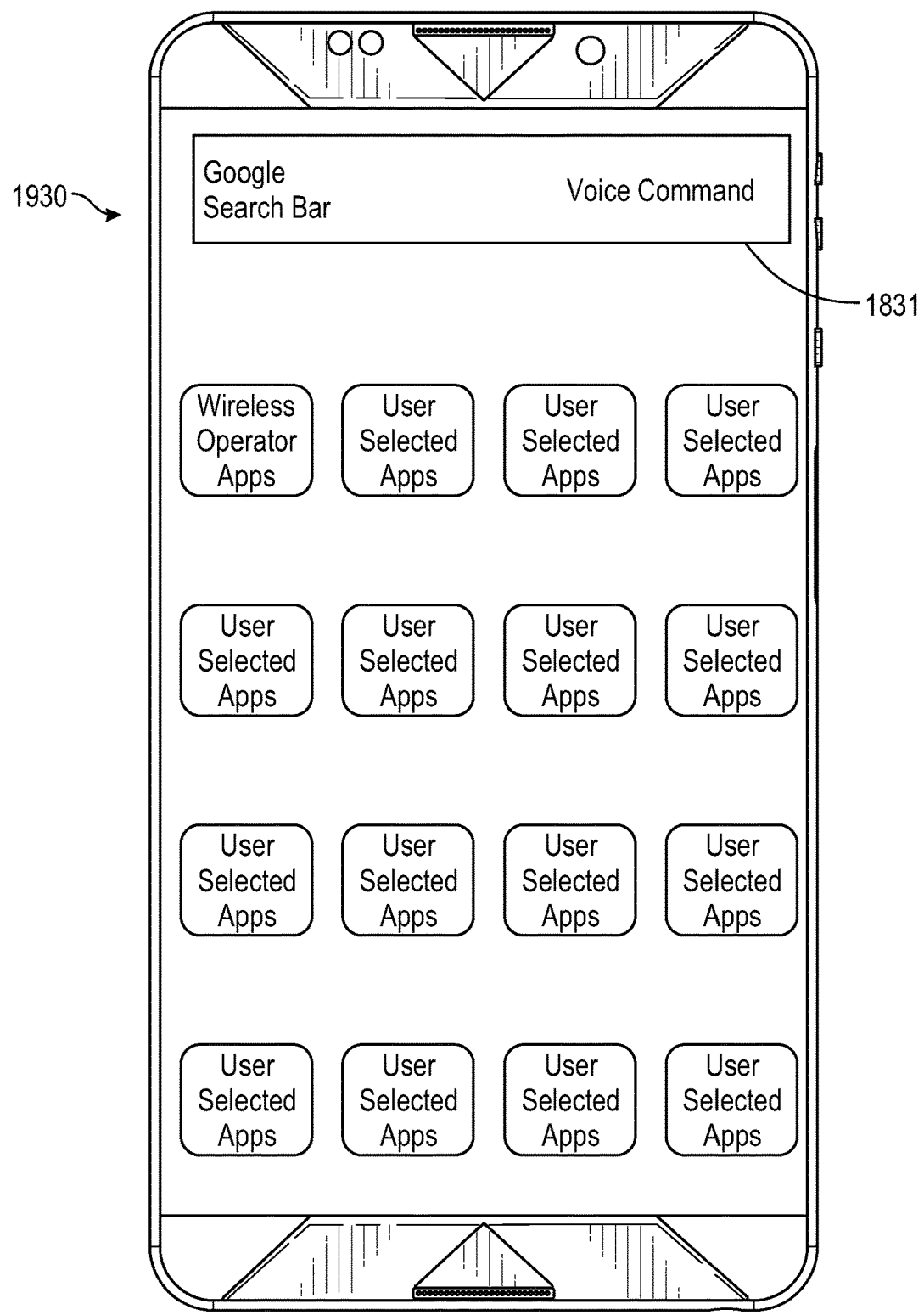
FIG. 19B may depict a front view of a smartphone displaying a default "apps" screen, which may be accessible from a home page screen.

FIG. 19B may depict a front view of a smartphone displaying a default "apps" screen, which may be accessible from a home page screen displayed on touchscreen 101. In some embodiments, apps-list-display 1930 may display a first page of apps (programs). In some embodiments, apps-list-display 1930 may display various virtual buttons for launching various apps (applications/programs). The apps displayed from apps-list-display 1930 may comprise wireless operator apps and user selected apps. At a top of touchscreen 101 in FIG. 19B may also be displayed command-prompt 1831. In some embodiments, command-prompt 1831 may provide a field for entering search queries. In some embodiments, command-prompt 1831 may status of various voice activated commands.

Figure 19C:
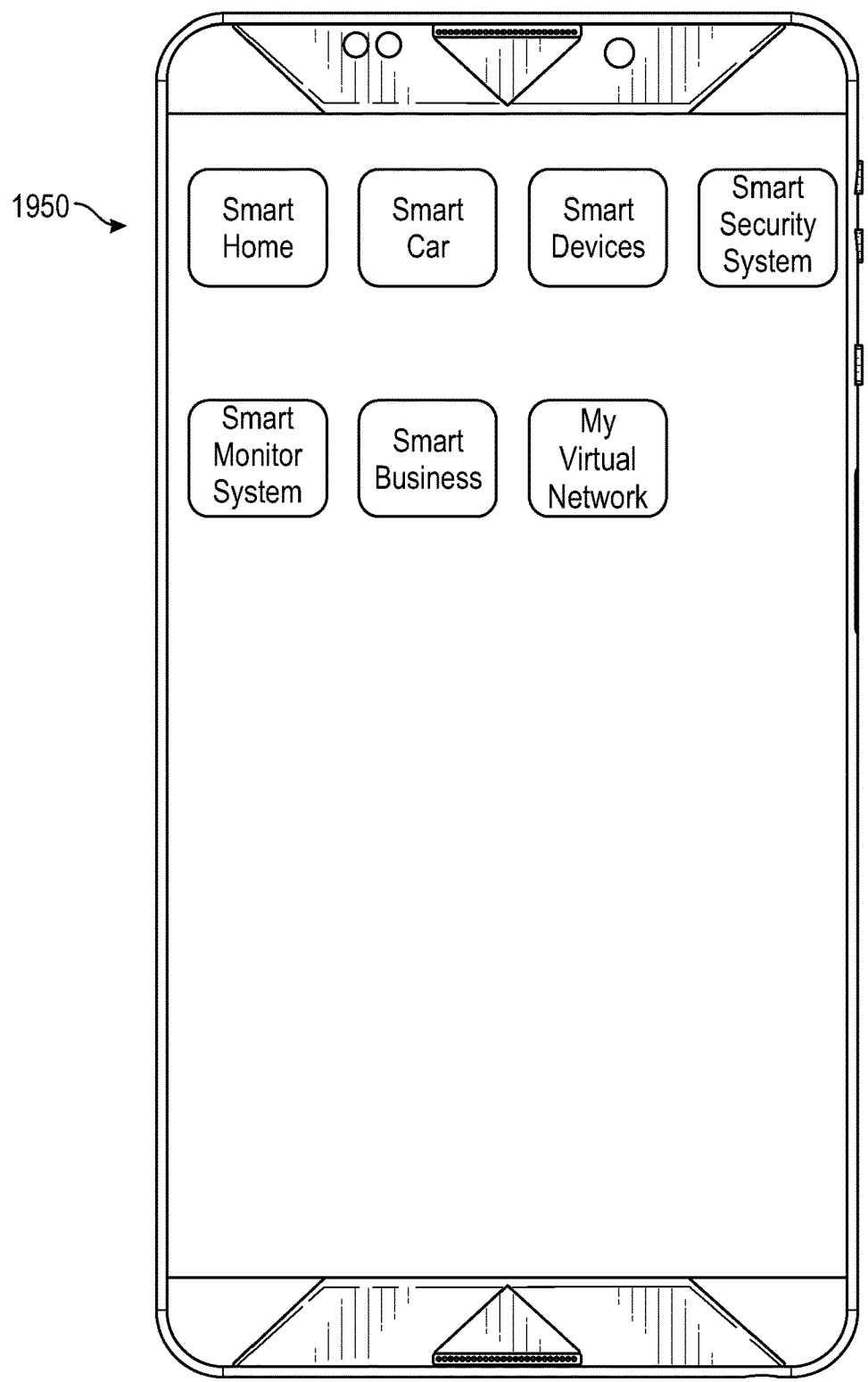
FIG. 19C may depict a front view of a smartphone displaying of "smart apps" screen.

FIG. 19C may depict a front view of smartphone 100 (and/or smartphone 800) displaying of "smart apps" screen. In some embodiments, apps-display 1950 may display various "special" apps. These special apps may be apps provided by a supplier of smartphone 100 (and/or smartphone 800). These special apps may be apps provided by a wireless operator (e.g., internet service provider) and/or by third parties under agreement (e.g., license) with the supplier of smartphone 100 (and/or smartphone 800) and/or the wireless operator. These special apps may be various "smart apps," such as, but not limited to: Smart Home, Smart Car, Smart Devices, Smart Business, Smart Security System, My Virtual Network, and/or Smart Monitor System. These special apps may be various "smart apps" for managing and/or controlling internet-of-things devices accessible by the user.

Note, the smartphones (e.g., a smartphone 100 and/or a smartphone 800) discussed herein may also be known as a "Global Hybrid Multi-mode Smartphone" or GHMS" for short; wherein such smartphone may have various Smart Apps. Note, the smartphones (e.g., a smartphone 100 and/or a smartphone 800) discussed herein may also be known as a mobile-computing-device.

Smartphones with multi-mode functionality (for connecting to and/or utilizing technologically diverse and different networks [e.g., terrestrial based cellular and/or Wi-Fi networks and/or satellite based networks], as well as different networks being operated by different service providers) have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A mobile-computing-device comprising:
a touchscreen occupying a majority of surface area of a front of the mobile-computing-device; wherein the touchscreen displays content and receives inputs;
at least three different communication circuits, a first-communication-circuit, a second-communication-circuit, and a third-communication-circuit; wherein the first-communication-circuit is in removable wireless two-way communication with a cellular network, wherein the first-communication-circuit is configured for handling long-term evolution category M1 (LTE-M) communications, a type of low power wide area network (LPWAN) radio standard and wherein the first-communication-circuit is configured for handling narrow-band internet-of-things (NB-IOT) communications, another type of LPWAN radio standard; wherein the second-communication-circuit is in removable wireless two-way communication with at least one satellite in earth orbit of a satellite-network; wherein the third-communication-circuit is in removable wireless two-way communication with the internet; wherein the first-communication-circuit, the second-communication-circuit, or the third-communication-circuit is configured for handling Symphony Link communications or LoRaWAN communications, wherein the Symphony Link and the LoRaWAN are specific types of LPWANs;

at least one baseband processor; wherein the at least one baseband processor is in communication with the first-communication-circuit; wherein the at least one baseband processor is in communication with the second-communication-circuit; and at least one application processor; wherein the at least one application processor is in communication with the third-communication-circuit; wherein the at least one application processor is in communication with the at least one baseband processor; and wherein the touchscreen is in communication with a display-power-management-integrated circuit that is in communication one or more of the at least one baseband processor and the at least one application processor, wherein with respect to a front of the mobile-computing-device, the touchscreen is bound at a top by a top-panel and bound at a bottom by a bottom-panel, wherein both the top-panel and the bottom-panel are shaped as a trapezoid; and wherein the touchscreen, the first-communication-circuit, the second-communication-circuit, the third-communication-circuit, the at least one baseband processor, and the at least one application processor are non-removable from the mobile-computing-device.

2. The mobile-computing-device according to claim 1, wherein the mobile-computing-device further comprises at least one region of solar panel located on a backside of the mobile-computing-device; wherein the backside is opposed to the front; wherein the at least one region of solar panel occupies a majority of surface area of the backside; wherein the at least one region of solar panel is used to at least partially charge a battery of the mobile-computing-device.

3. The mobile-computing-device according to claim 1, wherein the first-communication-circuit comprises a first radio-frequency transceiver, a first power-amplifier, and a first antenna; and wherein the second-communication-circuit comprises a second radio-frequency transceiver, a second power-amplifier, and a second antenna for wireless communications with the at least one satellite; and wherein the third-communication-circuit comprises a third antenna; wherein the first antenna, the second antenna, and the third antenna are at least partially housed within the mobile-computing-device.

4. The mobile-computing-device according to claim 3, wherein the second antenna is substantially extendable out from an antenna-hole beyond a top of the mobile-computing-device; wherein when the second antenna is not substantially extended the second antenna is housed substantially internally in the mobile-computing-device.

5. The mobile-computing-device according to claim 1, wherein the mobile-computing-device further comprises one or more light-emitting-diode strips located substantially around an outside edge of the touchscreen, wherein the one or more light-emitting-diode strips is not motion activated, and wherein when the one or more light-emitting-diode strips is activated, light is emitted in a non-random pattern.

6. The mobile-computing-device according to claim 5, wherein at least portions of the one or more light-emitting-diode strips emit light in different patterns to distinguish between different types of incoming communications and to distinguish between different senders of the incoming communications.

7. The mobile-computing-device according to claim 1, wherein the mobile-computing-device further comprises a bottom-panel on the front of the mobile-computing-device and towards a bottom region of the mobile-computing-device; wherein the bottom-panel houses a home-screen-button.

8. The mobile-computing-device according to claim 7, wherein the bottom-panel is substantially shaped as a trapezoid.

9. The mobile-computing-device according to claim 7, wherein the home-screen-button is substantially shaped as a triangle.

10. The mobile-computing-device according to claim 7, wherein the home-screen-button is substantially shaped as a square.

11. The mobile-computing-device according to claim 1, wherein the mobile-computing-device further comprises a top-panel on the front of the mobile-computing-device and towards a top region of the mobile-computing-device; wherein the top-panel houses a dummy-button with speaker.

12. The mobile-computing-device according to claim 11, wherein the top-panel is substantially shaped as a bottom-panel of the mobile-computing-device.

13. The mobile-computing-device according to claim 11, wherein the dummy-button with speaker is substantially shaped as a home-screen-button of the mobile-computing-device.

14. The mobile-computing-device according to claim 1, wherein one or more of the at least three different communication circuits facilitates data transmission.

15. The mobile-computing-device according to claim 1, wherein one or more of the at least three different communication circuits facilitates voice phone calls.

16. The mobile-computing-device according to claim 1, wherein the touchscreen displays a home screen, wherein the home screen displays a plurality of virtual buttons for launching predetermined functions; wherein the plurality of virtual buttons is arranged into four rows and four columns; wherein in a first row, starting at in an upper left direction and moving towards the right is a "Settings" virtual button, followed by an "Apps" virtual button, followed by a "Calendar" virtual button, followed by a "Clock" virtual button; wherein in a second row, below the first row, and moving towards the right is a "Google Apps" virtual button, followed by a "Google Maps" virtual button, followed by a "Play Store" virtual button, followed by a "Youtube" virtual button; wherein in a third row, below the second row, and moving towards the right is a "Camera" virtual button, followed by a "Gallery" virtual button, followed by a "Gmail" virtual button, followed by an "Email" virtual button; wherein in a fourth and final row, below the third row, moving towards the right is a "Phone Voicemail" virtual button, followed by a "Contacts" virtual button, followed by a "Text" virtual button, and followed by an "Internet" virtual button.

17. The mobile-computing-device according to claim 1, wherein the touchscreen displays a home screen, wherein the home screen displays a plurality of virtual buttons for launching predetermined functions; wherein the plurality of virtual buttons is arranged into four rows and three columns; wherein in a first row, starting at in an upper left direction and moving towards the right is a "Settings" virtual button, followed by an "Apps" virtual button, followed by a "Calendar" virtual button; wherein in a second row, below the first row, and moving towards the right is a "Google Apps" virtual button, followed by a "Google Maps" virtual button, followed by a "Play Store" virtual button; wherein in a third row, below the second row, and moving towards the right is a "Camera" virtual button, followed by a "Gallery" virtual button, followed by an "Email" virtual button; wherein in a fourth and final row, below the third row, moving towards the right is a "Phone Voicemail" virtual button, followed by a "Text" virtual button, and followed by an "Internet" virtual button.

18. The mobile-computing-device according to claim 1, wherein the touchscreen displays a home screen, wherein the home screen display a time, a date, and displays a region of geographic-relevant-information; wherein the time, the date, and the region of geographic-relevant-information are displayed in a top region of the touchscreen, wherein the geographic-relevant-information displays temperature and closest local city.

19. The mobile-computing-device according to claim 1, wherein the mobile-computing-device further comprises at least one forward facing camera on the front of the mobile-computing-device; and wherein the mobile-computing-device further comprises at least one rear facing camera located on a backside of the mobile-computing-device.

20. The mobile-computing-device according to claim 1, wherein the mobile-computing-device further comprises a fingerprint scanner located on a backside of the mobile-computing-device.

21. The mobile-computing-device according to claim 1, wherein the mobile-computing-device further comprises a power-button for turning on or off the mobile-computing-device; wherein the power-button is substantially shaped as a square.

22. The mobile-computing-device according to claim 1, wherein the mobile-computing-device further comprises a pair of volume-buttons for lowering or increasing sounds emitted by the mobile-computing-device; wherein each of the pair of volume-buttons is substantially shaped as a triangle.

\* \* \* \* \*